(12) United States Patent
Kumar et al.

(10) Patent No.: US 10,994,727 B1
(45) Date of Patent: May 4, 2021

(54) SUBSCRIPTION-BASED AND EVENT-BASED CONNECTED VEHICLE CONTROL AND RESPONSE SYSTEMS

(71) Applicant: Allstate Insurance Company, Northbrook, IL (US)

(72) Inventors: Surender Kumar, Palatine, IL (US); Clint J. Marlow, Barrington, IL (US); Timothy W. Gibson, Barrington, IL (US); Mark V. Slusar, Chicago, IL (US); Chris Wiklund, Downers Grove, IL (US); Younuskhan Mohamed Iynoolkhan, Rolling Meadows, IL (US)

(73) Assignee: Allstate Insurance Company, Northbrook, IL (US)

( * ) Notice: Subject to any disclaimer, the term of this patent is extended or adjusted under 35 U.S.C. 154(b) by 48 days.

(21) Appl. No.: 16/364,856

(22) Filed: Mar. 26, 2019

Related U.S. Application Data

(63) Continuation-in-part of application No. 15/667,484, filed on Aug. 2, 2017, now Pat. No. 10,518,729.

(51) Int. Cl.
*B60W 30/09* (2012.01)
*G07C 5/08* (2006.01)
(Continued)

(52) U.S. Cl.
CPC ......... *B60W 30/09* (2013.01); *G06Q 30/0213* (2013.01); *G07C 5/085* (2013.01);
(Continued)

(58) Field of Classification Search
CPC ..... B60R 21/013; G05D 1/0088; G07C 5/008
(Continued)

(56) References Cited

U.S. PATENT DOCUMENTS 7,272,357 B2   9/2007   Nishiga et al.
7,348,895 B2   3/2008   Lagassey
(Continued)

OTHER PUBLICATIONS

Caitlin Motsinger et al., A review of vehicle-to-vehicle and vehicle-to-infrastructure initiatives, The Clemson University Vehicular Electronics Laboratory, Oct. 3, 2007, 1-24, http://www.cvel.clemson.edu/Reports/CVEL-07-003.pdf.
(Continued)

*Primary Examiner* — Yazan A Soofi
(74) *Attorney, Agent, or Firm* — Banner & Witcoff, Ltd.

(57) ABSTRACT

Event-based and subscription-based connected vehicle control and response systems, methods, and apparatus are disclosed. An example method comprises receiving first data acquired by a first plurality of vehicle operation sensors of a first vehicle from a first computing device associated with a first subscriber, identifying an occurrence of an event involving a second vehicle and a third vehicle based on the first data, receiving second data acquired by a second plurality of vehicle operation sensors of the second vehicle, identifying which vehicle of the second vehicle or the third vehicle is at-fault based on the first data and the second data, determining, for the first subscriber and responsive to determining that the first data was used in determining which of the first vehicle or the second vehicle is at-fault, one or more objects, and transmitting the one or more objects to the first computing device.

17 Claims, 13 Drawing Sheets

(51) Int. Cl.
  *G08G 1/16* (2006.01)
  *G08G 1/01* (2006.01)
  *G06Q 30/02* (2012.01)
(52) U.S. Cl.
  CPC ........... *G08G 1/0125* (2013.01); *G08G 1/161* (2013.01); *B60W 2554/00* (2020.02)
(58) Field of Classification Search
  USPC .......................................................... 701/45
  See application file for complete search history.

(56) References Cited

U.S. PATENT DOCUMENTS

| | | | |
|---|---|---|---|
| 8,063,793 B2 | 11/2011 | Shrum, Jr. | |
| 8,255,144 B2 | 8/2012 | Breed et al. | |
| 8,280,583 B2 | 10/2012 | Stahlin et al. | |
| 8,520,695 B1 | 8/2013 | Rubin et al. | |
| 8,799,034 B1 | 8/2014 | Brandmaier et al. | |
| 9,019,092 B1 | 4/2015 | Brandmaier et al. | |
| 9,159,231 B2 | 10/2015 | Noh | |
| 9,269,268 B2 | 2/2016 | Bowers et al. | |
| 9,390,451 B1 | 7/2016 | Slusar | |
| 9,430,944 B2 | 8/2016 | Grimm et al. | |
| 9,475,500 B2 | 10/2016 | Grimm et al. | |
| 2012/0166229 A1* | 6/2012 | Collins | G06Q 40/08 705/4 |
| 2013/0222133 A1* | 8/2013 | Schultz | H04W 4/021 340/539.13 |
| 2015/0127733 A1 | 5/2015 | Ding et al. | |
| 2016/0133130 A1* | 5/2016 | Grimm | H04W 4/80 340/905 |
| 2016/0323741 A1 | 11/2016 | Lee et al. | |
| 2016/0332570 A1 | 11/2016 | Kunkel | |
| 2017/0012657 A1 | 1/2017 | Stahlin et al. | |
| 2017/0017734 A1* | 1/2017 | Groh | G06F 30/20 |
| 2017/0138108 A1* | 5/2017 | Kothari | E05F 15/40 |
| 2018/0053401 A1* | 2/2018 | Martin | G08B 29/188 |

OTHER PUBLICATIONS

Julio A. Sanguesa et al., Sensing Traffic Density Combining V2V and V2I Wireless Communications, Sensors, Dec. 16, 2015, 31795-31810, MDPI, Basel, Switzerland, www.mdpi.com/1424-8220/15/12/29889/pdf.

Manuel Fogue et al., Automatic Accident Detection: Assistance Through Communication Technolohies and vehicles, Sep. 2012, 1-3, http://ieeexplore.ieee.org/document/6269155/?reload=true.

Oct. 22, 2018—(WO) International Search Report & Written Opinion—App PCT/US18/044814.

Dec. 13, 2018—U.S. Non-Final Office Action—U.S. Appl. No. 15/667,484.

* cited by examiner

US 10,994,727 B1

SUBSCRIPTION-BASED AND EVENT-BASED CONNECTED VEHICLE CONTROL AND RESPONSE SYSTEMS

This application is a continuation-in part of U.S. patent application Ser. No. 15/667,484 filed Aug. 2, 2017, which is incorporated herein by reference in its entirety.

TECHNICAL FIELD

Aspects of the present disclosure generally relate to event-based connected vehicle control and response systems and to subscription-based events and rewards processing systems.

BACKGROUND

Often, an event occurs involving one or more vehicles. Numerous entities may be involved in the aftermath of an event, elongating the process of restoring the environment in which the event occurs. For example, one or more additional vehicles are often drawn to an event to clear and/or repair damage to the vehicles and/or environment. Currently, the vehicles involved in the event, or in the vicinity, do little to impact such restoration and instead are a burden on the restoration process. Additionally, currently, the data from the vehicles involved in the event, or in the vicinity is underutilized during the processing of the event.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to identifying events including vehicle and/or infrastructure accidents and/or near misses based on data uploaded from subscribers, determining an at-fault party involved in the event based on the data uploaded from the subscribers, and generating one or more objects for subscribers whose uploaded data was determining the at-fault party. An example system comprises a first vehicle comprising a first plurality of vehicle operation sensors to detect vehicle and environment parameters, a second vehicle comprising a second plurality of vehicle operation sensors, a first computing device associated with a first vehicle, a second computing device, and a server comprising at least one processor and memory comprising instructions that, when executed by the at least one processor, cause the server to receive first data acquired by the first plurality of vehicle operation sensors from the first computing device, identify an occurrence of an event involving the first vehicle and the second vehicle, request, from the second computing device, data acquired by the second plurality of vehicle operation sensors, receive, from the second computing device, second data acquired by the second plurality of vehicle operation sensors, identify, based on the first data and the second data, which vehicle of the first vehicle or the second vehicle is at-fault, determine, for a first subscriber associated with the first computing device and responsive to determining that the first data was used in determining which of the first vehicle or the second vehicle is at-fault, one or more objects, and transmit, to the first computing device, the one or more objects.

An example apparatus comprises one or more processors, and memory storing instructions that, when executed by the one or more processors, cause the apparatus to receive, from a first computing device associated with a first subscriber, first data acquired by a first plurality of vehicle operation sensors of a first vehicle, identify, based on the first data, an occurrence of an event involving a second vehicle and a third vehicle, receive second data acquired by a second plurality of vehicle operation sensors of the second vehicle, identify, based on the first data and the second data, which vehicle of the second vehicle or the third vehicle is at-fault, determine, for the first subscriber and responsive to determining that the first data was used in determining which of the first vehicle or the second vehicle is at-fault, one or more objects, and transmit, to the first computing device, the one or more objects.

An example method comprises receiving, from a first computing device associated with a first subscriber, first data acquired by a first plurality of vehicle operation sensors of a first vehicle, identifying, based on the first data, an occurrence of an event involving a second vehicle and a third vehicle, receiving second data acquired by a second plurality of vehicle operation sensors of the second vehicle, identifying, based on the first data and the second data, which vehicle of the second vehicle or the third vehicle is at-fault, determining, for the first subscriber and responsive to determining that the first data was used in determining which of the first vehicle or the second vehicle is at-fault, one or more objects, and transmitting, to the first computing device, the one or more objects.

Additional and/or alternative aspects of the disclosure relate to identifying events including vehicle and/or infrastructure accidents and/or near misses, determining an at-fault party involved in the events, and automatically initiating a response to the at-fault determination. An example system comprises a first vehicle comprising a first plurality of vehicle operation sensors to detect vehicle and environment parameters, a second vehicle comprising a second plurality of vehicle operation sensors, and a server comprising at least one processor, and memory comprising instructions that, when executed by the at least one processor, cause the server to identify an occurrence of an event involving the first vehicle and the second vehicle, store first data acquired by the first plurality of vehicle operation sensors for a first threshold amount of time prior to the event, during the occurrence of the event, and for a second threshold amount of time after the event, store second data acquired by the second plurality of vehicle operation sensors for a third threshold amount of time prior to the event, during the occurrence of the event, and for a fourth threshold amount of time after the event, identify, based on the first data and the second data, which vehicle of the first vehicle or the second vehicle is at-fault, aggregate the first data and second data into an event report, and initiate a response via a system associated with the vehicle identified as at-fault.

An example apparatus comprises one or more processors, and memory storing instructions that, when executed by the one or more processors, cause the apparatus to at least identify the occurrence of an event, store first data corresponding to apparatus operation for a first threshold amount of time prior to the event, during the occurrence of the event, and for a second threshold amount of time after the event, determine whether a responsive object is involved in or near the event, in response to determining that the responsive object is involved in or near the event, transmit the first data to the responsive object, and receive, from the responsive object, second data, analyze the first data and the second data to determine an at-fault party involved in the event, aggregate the first data and second data into an event report, and cause, automatically, a response to be initiated through a system associated with the at-fault party involved in the event.

An example method comprises identifying the occurrence of an event, storing first data corresponding to apparatus operation for a first threshold amount of time prior to the event, during the occurrence of the event, and for a second threshold amount of time after the event, determining whether a responsive object is involved in or near the event, in response to determining that the responsive object is involved in or near the event, transmitting the first data to the responsive object, and receiving, from the responsive object, second data, analyzing the first data and the second data to determine an at-fault party involved in the event, aggregating the first data and second data into an event report, and causing, automatically, a response to be initiated through a system associated with the at-fault party involved in the event.

DETAILED DESCRIPTION

Figure 1:
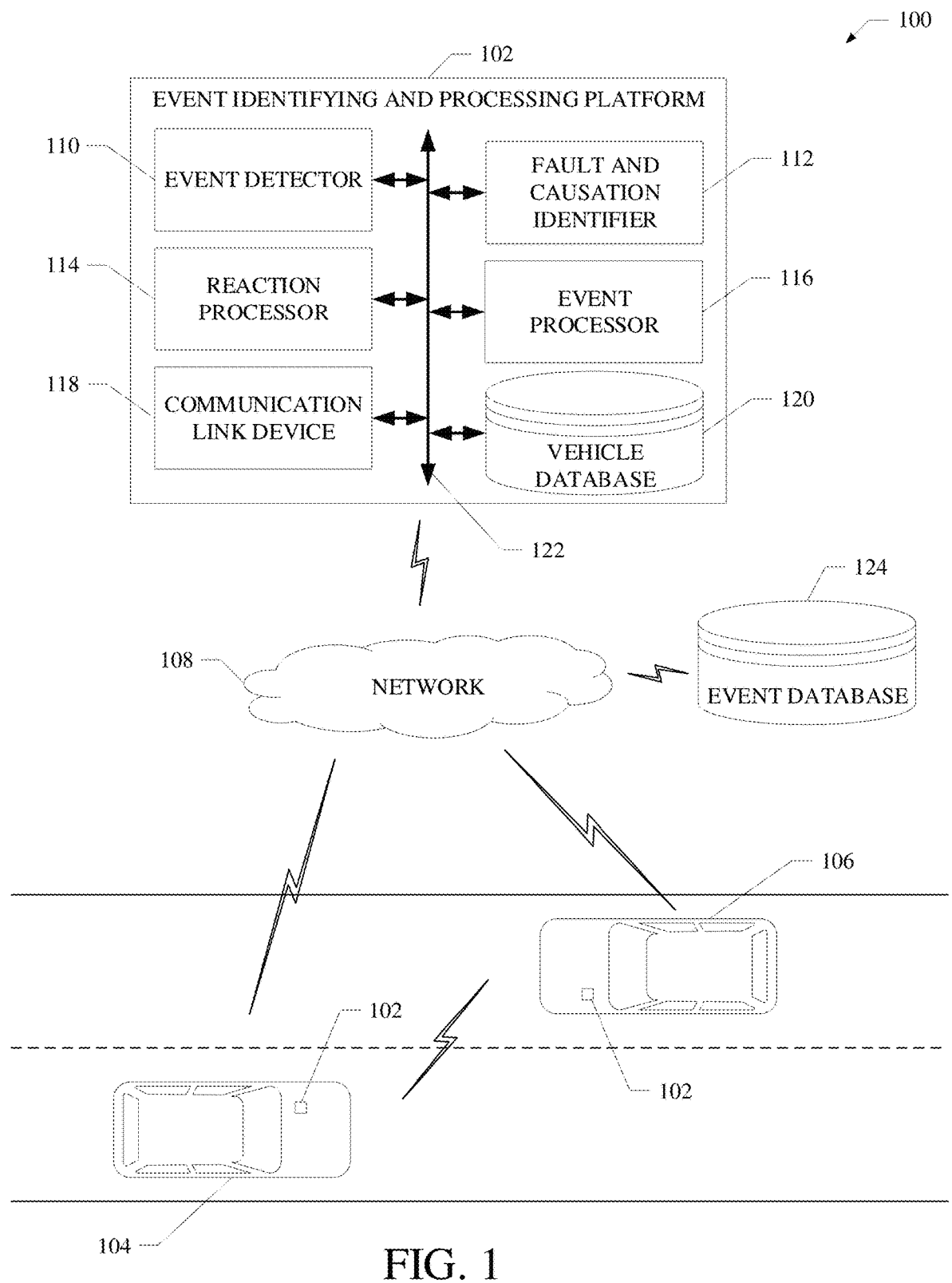
FIG. 1 illustrates an example environment comprising an event identifying and processing platform in communication with one or more vehicles connected over a network in accordance with one or more aspects described herein.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the disclosure relate to identifying events including vehicle and/or infrastructure accidents and/or near misses based on data uploaded from subscribers, determining an at-fault party involved in the event based on the data uploaded from the subscribers, and generating one or more objects for subscribers whose uploaded data was determining the at-fault party.

In some examples, one or more vehicles and/or infrastructure devices involved in and/or in the vicinity of an event collect and/or store data corresponding to date, time, speed of vehicles involved in the event, vehicle identification number, license plate information, route/location of the event (e.g., latitude and longitude, address, street, intersection, etc. based on a global positioning system in the vehicle and/or a user device), sensor and imagery data, whether safety features are equipped/activated in a vehicle, national highway traffic safety administration (NHTSA) level of autonomy of the vehicle, whether the vehicle or driver was in control of the vehicle, communications from the vehicle to the driver, communication from vehicle to other vehicles, communication from vehicle to infrastructure devices, known driving conditions, known weather conditions, type of damage, severity of damage, condition of the vehicle, registered vehicle owners/drivers, number of passengers, whether seat belts were utilized, passenger weight, vehicle braking, estimate cost to replace/repair damage, etc. At least some data may be collected via one or more sensors or cameras. Additionally, or alternatively, at least some data may be programmed into and/or store on the respective vehicles and/or infrastructure devices. In some examples, the amount of data that is collected, stored, processed, and/or transmitted may be proportionate to the severity of the event, as further disclosed herein.

To collect or otherwise obtain the above described data, each vehicle and/or infrastructure device may comprise one or more sensors or may be in communication with one or more external devices (e.g., a mobile device owned by a driver of a vehicle) comprising one or more sensors, user profiles, or other data. For example, each vehicle and/or infrastructure device may comprise odometers, global positioning systems, cameras, level sensors (to detect rollovers), force/pressure/impact sensors, range/proximity sensors, various wireless network interfaces capable of detect access to different data networks, mobile networks, and other mobile devices (e.g., via Bluetooth), clocks, and/or movement sensors such as, for example, accelerometers, speedometers, compasses, and gyroscopes.

Additional vehicle sensors may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. In some examples, the vehicles also may include sensors configured to collect data associated with a driver's movements or the condition of a driver, for example, sensors that monitor a driver's movements, such as the driver's eye position and/or head position, etc. Additional safety or guidance-assistance features may be included in some vehicles, detecting and storing data such as lane departures, activation of adaptive cruise control, blind spot alerts, etc. The sensors may be installed during vehicle manufacture or as an after-market addition.

Each vehicle may comprise communication links to establish vehicle-to-vehicle ("V2V") communications. As disclosed herein, V2V communication may be accomplished with a short-range vehicle-based data transmission systems configured to transmit vehicle operational data to other nearby vehicles, and to receive vehicle operational data from other nearby vehicles. In some examples, the communication system may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other examples, such as wireless local area network (WLAN) communication protocols (e.g., IEEE 802.11), Bluetooth (e.g., IEEE 802.15.1), or one or more of the Communication Access for Land Mobiles (CALM) wireless communication protocols and air interfaces. The vehicle to vehicle transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles (e.g., transceivers, antennas, etc.), while in other examples the communication systems may be implemented using existing vehicle hardware components (e.g., radio and satellite equipment, navigation computers) or may be implemented by software running on the mobile devices of drivers and passengers within the vehicles.

The range of V2V communications between vehicles may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device in one vehicle to determine that another vehicle is tailgating or cut-off the vehicle, whereas longer communications may allow the device to determine additional types of driving behaviors (e.g., vehicle spacing, yielding, defensive avoidance, proper response to a safety hazard, etc.) and driving conditions (e.g., congestion).

Vehicle communications also may include vehicle-to-infrastructure ("V2I") communications, such as transmissions from vehicles to non-vehicle responsive devices (i.e., infrastructure devices), for example, toll booths, rail road crossings, and road-side traffic monitoring devices. V2I communications may be performed similarly as described above with reference to V2V communications. Certain V2V communication systems may periodically broadcast data from a vehicle to any other vehicle, or other infrastructure device capable of receiving the communication, within the range of the vehicle's transmission capabilities. For example, a vehicle may periodically broadcast (e.g., every 0.1 second, every 0.5 seconds, every second, every 5 seconds, etc.) certain vehicle operation data via its short-range communication system, regardless of whether or not any other vehicles or reception devices are in range. In other examples, a vehicle communication system may first detect nearby vehicles and receiving devices, and may initialize communication with each by performing a handshaking transaction before beginning to transmit its vehicle operation data to the other vehicles and/or devices.

In still other examples, a mobile device may establish communication with an on-board vehicle system. For example, either the mobile device or a vehicle may be implemented with hardware (e.g., an input port or docking station) and/or software (e.g., network interfaces, secure protocols and encryption, etc.), and may be designed and configured to establish communication (using a wired or wireless connection) between the mobile device and an on-board vehicle system. For example, a smartphone or tablet computer, which is often carried by a user, may include an on-board vehicle system interface to detect and/or connect to an on-board vehicle system whenever the user is driving (and/or riding as a passenger) in a vehicle. After a mobile device establishes communication with an on-board vehicle system, which may be a telematics device, on-board diagnostic system, vehicle navigation device, or other vehicle computer system, the mobile device may receive vehicle sensor data collected by various vehicle sensors. Thus, smartphones or tablet computers may use vehicle interfaces to receive some or all of the same vehicle sensor data and driving data that is accessible to on-board vehicle systems, discussed above.

Based on the collected data from the one or more vehicles and/or infrastructure devices, the systems, methods, and apparatus determine one or more parties at-fault (if more than one party is at fault, determine the fault distribution), one or more potential or actual causes of the event, and/or one or more reactions to the event. In some examples, data from previous events (e.g., previous causation and/or fault determination data stored with an event database) may be used to determine the one or more parties at fault for a current event. Based on these example determinations, the systems, methods, and apparatus disclosed herein may be able to recognize event causations and, thus, identify or predict future events before they occur. For example, as further disclosed herein, machine learning algorithms may be utilized to identify warning signs of events and recognize future similar warning signs in order to predict an event is about to occur. The disclosed systems, methods, and apparatus may further transmit instructions to drivers for performing a vehicle maneuver to avoid and/or reduce the severity of an event or may instruct autonomous or semi-autonomous vehicles to avoid and/or reduce the severity of an event by transmitting programmed vehicle maneuvers (e.g., decelerate, accelerate, swerve left, swerve right, stop, reverse, etc.) to the vehicle. Such transmissions may occur at the time of the event (e.g., in real time) or may be transmitted prior to the event and determined to be presented/initiated at the time of the event. Additionally, the systems, methods, and apparatus disclosed herein may automatically populate one or more event reports for emergency services (e.g., emergency medical technicians (EMTs), police, firefighters, etc.), vehicle repair services (e.g., body shop, tow trucks, etc.), infrastructure repair services (e.g., road sign repair, traffic signal repair, guardrail repair, pothole repair, etc.), etc.

An example system comprises a first vehicle comprising a first plurality of vehicle operation sensors to detect vehicle and environment parameters, a second vehicle comprising a second plurality of vehicle operation sensors, a first computing device associated with a first vehicle, a second computing device, and a server comprising at least one processor and memory comprising instructions that, when executed by the at least one processor, cause the server to receive first data acquired by the first plurality of vehicle operation sensors from the first computing device, identify an occurrence of an event involving the first vehicle and the second vehicle, request, from the second computing device, data acquired by the second plurality of vehicle operation sensors, receive, from the second computing device, second data acquired by the second plurality of vehicle operation sensors, identify, based on the first data and the second data, which vehicle of the first vehicle or the second vehicle is at-fault, determine, for a first subscriber associated with the first computing device and responsive to determining that the first data was used in determining which of the first vehicle or the second vehicle is at-fault, one or more objects, and transmit, to the first computing device, the one or more objects.

In some examples the first vehicle may be an autonomous vehicle.

In some examples, the instructions, when executed by the at least one processor, may cause the server to determine that a second subscriber was within a predetermined distance of the event, request, via the first computing device, recorded data associated with the second subscriber, and receive, via the first computing device, the recorded data associated with the second subscriber.

In some examples, the instructions, when executed by the at least one processor, may cause the server to generate, based on the event, an event avoidance maneuver, and transmit, to a second subscriber and responsive to determining that first subscriber is within a predetermined distance of the event, the event avoidance maneuver.

In some examples, the one or more objects may be determined based on historical data associated with the first subscriber.

In some examples, the instructions, when executed by the at least one processor, may cause the server to receive, from the first computing device, data associated with an interaction between the first subscriber and the one or more objects, and store the data.

An example apparatus comprises one or more processors, and memory storing instructions that, when executed by the one or more processors, cause the apparatus to receive, from a first computing device associated with a first subscriber, first data acquired by a first plurality of vehicle operation sensors of a first vehicle, identify, based on the first data, an occurrence of an event involving a second vehicle and a third vehicle, receive second data acquired by a second plurality of vehicle operation sensors of the second vehicle, identify, based on the first data and the second data, which vehicle of the second vehicle or the third vehicle is at-fault, determine, for the first subscriber and responsive to determining that the first data was used in determining which of the first vehicle or the second vehicle is at-fault, one or more objects, and transmit, to the first computing device, the one or more objects.

In some examples the first vehicle may be an autonomous vehicle.

In some examples, the instructions, when executed by the one or more processors, may cause the apparatus to determine that a second subscriber was within a predetermined distance of the event, request, via the first computing device, recorded data associated with the second subscriber, and receive, via the first computing device, the recorded data associated with the second subscriber.

In some examples, the instructions, when executed by the one or more processors, may cause the apparatus to generate, based on the event, an event avoidance maneuver, and transmit, to a second subscriber and responsive to determining that second subscriber is within a predetermined distance of the event, the event avoidance maneuver.

In some examples, the one or more objects may be determined based on historical data associated with the first subscriber.

In some examples, the instructions, when executed by the one or more processors, may cause the apparatus to receive, from the first computing device, data associated with an interaction between the first subscriber and the one or more objects, and store the data An example method comprises receiving, from a first computing device associated with a first subscriber, first data acquired by a first plurality of vehicle operation sensors of a first vehicle, identifying, based on the first data, an occurrence of an event involving a second vehicle and a third vehicle, receiving second data acquired by a second plurality of vehicle operation sensors of the second vehicle, identifying, based on the first data and the second data, which vehicle of the second vehicle or the third vehicle is at-fault, determining, for the first subscriber and responsive to determining that the first data was used in determining which of the first vehicle or the second vehicle is at-fault, one or more objects, and transmitting, to the first computing device, the one or more objects.

In some examples the method may comprise determining that a second subscriber was within a predetermined distance of the event, requesting, via the first computing device, recorded data associated with the second subscriber, and receiving, via the first computing device, the recorded data associated with the second subscriber.

In some examples the method may comprise generating, based on the event, an event avoidance maneuver, and transmitting, to a second subscriber and responsive to determining that second subscriber is within a predetermined distance of the event, the event avoidance maneuver.

In some examples the one or more objects may be determined based on historical data associated with the first subscriber.

In some examples the method may comprise receiving, from the first computing device, data associated with an interaction between the first subscriber and the one or more objects, and storing the data.

In some examples the first vehicle may be an autonomous vehicle.

An example system to determine fault of an accident and automatically initiate a response comprises a first vehicle comprising a first plurality of vehicle operation sensors to detect vehicle and environment parameters, a second vehicle comprising a second plurality of vehicle operation sensors, and a server comprising at least one processor, and memory comprising instructions that, when executed by the at least one processor, cause the server to identify an occurrence of an event involving the first vehicle and the second vehicle, store first data acquired by the first plurality of vehicle operation sensors for a first threshold amount of time prior to the event, during the occurrence of the event, and for a second threshold amount of time after the event, store second data acquired by the second plurality of vehicle operation sensors for a third threshold amount of time prior to the event, during the occurrence of the event, and for a fourth threshold amount of time after the event, identify, based on the first data and the second data, which vehicle of the first vehicle or the second vehicle is at-fault, aggregate the first data and second data into an event report, and initiate a response through a system associated with the vehicle identified as at-fault.

In some examples, the first vehicle is an autonomous vehicle.

In some examples, the event comprises at least one of a near miss or an accident involving at least one of the first vehicle or the second vehicle.

In some examples, wherein the instructions, when executed by the at least one processor, cause the server to generate, based on the first data and the second data, an event avoidance maneuver, and transmit, to the first vehicle and the second vehicle for avoiding and/or reducing the severity of other events similar to the event, the event avoidance maneuver.

In some examples, the instructions, when executed by the at least one processor, cause the server to verify at least a first portion of the first data with at least a second portion of the second data.

In some examples, the system further comprises a connected infrastructure device comprising a plurality of sensors to detect environment parameters. In some examples, environmental parameters include, without limitation, the date, time, location of the device (e.g., latitude and longitude, address, street, intersection, etc.), sensor and imagery data surrounding the device, weather conditions, climate data, and/or other collectable data within a radius of the device.

In some examples, the system further comprises a third vehicle not involved in the event, wherein the instructions, when executed by the at least one processor, cause the server to store third data acquired by a third plurality of vehicle sensors associated with the third vehicle, identify, based on the first data, the second data, and the third data, which vehicle of the first vehicle or the second vehicle is at-fault, and aggregate the first data, the second data, and the third data into the event report.

An example apparatus to determine a party at-fault in an event comprises one or more processors, and memory storing instructions that, when executed by the one or more processors, cause the apparatus to at least identify an occurrence of an event, store first data corresponding to apparatus operation for a first threshold amount of time prior to the event, during the occurrence of the event, and for a second threshold amount of time after the event, determine whether a responsive object is involved in or near the event, in response to determining that the responsive object is involved in or near the event, transmit the first data to the responsive object, and receive, from the responsive object, second data, analyze the first data and the second data to determine an at-fault party involved in the event, aggregate the first data and second data into an event report, and cause, automatically, a response to be initiated through a system associated with the at-fault party involved in the event.

In some examples, the responsive object is at least one of a connected vehicle or a connected infrastructure device.

In some examples, the event comprises at least one of a near miss or an accident involving at least one vehicle.

In some examples, the instructions, when executed, cause the apparatus to input the first data and the second data into autonomous vehicle operation machine learning algorithms.

In some examples, the instructions, when executed, cause the apparatus to transmit, to an emergency entity or a repair entity, the event report.

In some examples, the event is a first event and the instructions, when executed, cause the apparatus to query an event database for third data corresponding to a second event similar to the first event, and analyze the first data, the second data, and the third data to determine the at-fault party involved in the event.

In some examples, the first data and the second data comprise at least one of driver information, event images, vehicle information, date of event, time of event, location of vehicles, speed of vehicles, NHTSA level of autonomy of the vehicles, sensor data from vehicles involved, environmental conditions, vehicle control status information, vehicles onboard telematics data, driver behavior information, or any combination thereof.

In some examples, the instructions, when executed, further cause the apparatus to determine, based on the first data and the second data, a cause of the event.

In some examples, the event is a first event and the instructions, when executed, cause the apparatus to query an event database for third data corresponding to a second event similar to the first event, and analyze the first data, the second data, and the third data to determine a cause of the event An example method to automatically initiate an automatic response to an event comprises identifying an occurrence of the event, storing first data corresponding to apparatus operation for a first threshold amount of time prior to the event, during the occurrence of the event, and for a second threshold amount of time after the event, determining whether a responsive object is involved in or near the event, in response to determining that the responsive object is involved in or near the event, transmitting the first data to the responsive object, and receiving, from the responsive object, second data, analyzing the first data and the second data to determine an at-fault party involved in the event, aggregating the first data and second data into an event report, and causing, automatically, a response to be initiated through a system associated with the at-fault party involved in the event.

In some examples, the method further comprises inputting the first data and the second data into autonomous vehicle operation machine learning algorithms.

In some examples, the method further comprises transmitting, to an emergency entity and an infrastructure repair entity, the event report.

In some example, the method further comprises determining, based on the first data and the second data, a cause of the event.

FIG. 1 illustrates an example environment 100 comprising an event identifying and processing platform 102 in communication with a first vehicle 104 and/or a second vehicle 106 connected over a network 108. In some examples, the first vehicle 104 and/or the second vehicle 106 are autonomous or semi-autonomous vehicles. The network 108 may be a cellular network, WI-FI® network, Bluetooth network, near-field communication network, etc. In some examples, the event identifying and processing platform 102 is a remote server accessible by the first vehicle 104 and/or the second vehicle 106 via the network 108. Additionally, or alternatively, the first vehicle 104 and/or the second vehicle 106 may comprise the event identifying and processing platform 102 within or in communication with an on-board computer of the first vehicle 104 and/or the second vehicle 106. As disclosed herein, the first vehicle 104 and/or the second vehicle 106 may be involved in an event that may damage one or more portions of the first vehicle 104 and/or the second vehicle 106. It may be advantageous for the first vehicle 104 and/or the second vehicle 106 to comprise the event identifying and processing platform 102 such that network availability does not impact the operations described herein. As disclosed herein, the first vehicle 104 and/or the second vehicle 106 may be involved in an event that may damage one or more portions of the first vehicle 104 and/or the second vehicle 106. Accordingly, it may be advantageous for the event identifying and processing platform 102 to be installed on the first vehicle 104, the second vehicle 106, and as a remote server, as illustrated in FIG. 1.

The example event identifying and processing platform 102 comprises an example event detector 110, an example fault and causation identifier 112, an example reaction processor 114, an example event processor 116, an example communication link device 118, and an example vehicle database 120. The example event detector 110, the example fault and causation identifier 112, the example reaction processor 114, the example event processor 116, the example communication link device 118, and the example vehicle database 120 may be connected or otherwise be in communication via a communication channel such as, for example, bus 122. The example event identifying and processing platform 102, the example first vehicle 104, and/or the example second vehicle 106 may further be in communication with an example event database 124 over the example network 108. In some examples, the event database 124 may be located within the first vehicle 104 and/or the second vehicle 106 such that network unavailability does not impact the operations described herein.

The example event detector 110 may determine the occurrence of an event, such as for example, a vehicle collision. The example event detector 110 may receive data from one or more accelerometers, configured to detect a deceleration above a threshold. In examples wherein the event is a vehicle collision, the accelerometers may detect a deceleration above a first threshold. In examples wherein the event is a near miss, the accelerometers may detect a deceleration above a second threshold, wherein the first threshold is higher than the second threshold. In such examples, the accelerometers may detect an acceleration subsequent to the deceleration and within a threshold amount of time, which may be indicative of the vehicle slowing in response to the event and accelerating away after avoiding the event. All vehicle operations may be associated with data signatures like those described above (e.g., deceleration followed by acceleration may be associated with coming to a stop without incident, rapid deceleration followed by nothing may be associated with a vehicle collision, etc.).

Additionally, or alternatively, other sensors may be used to similarly detect an event. For example, range sensors may be used to determine when an object occupies the same space as the vehicle (e.g., the object is 0 inches away). Furthermore, one or more cameras may be utilized in combination with image recognition and one or more machine learning algorithms (e.g., decision trees, neural networks, etc.) to "learn" what events (e.g., a vehicle collision) and the moments before the events look like, so that the event detector 110 may make future predictions of when an event is about to occur and/or is occurring.

As used herein, machine learning may include generating one or more models using data from the example event database 124 and one or more algorithms. In some examples, supervised machine learning is utilized, wherein the one or more generated models are presented with inputs and outputs, and the machine learning algorithm determines one or more general rules to maps the inputs to outputs. For example, a subset of the data from the example event database 124, such as, for example, camera data associated with past events, may be used as input data and prediction of occurrence of an event may be identified as the output. From these inputs and output (i.e., a training data set), the machine learning algorithms may be able to map visual indications of a vehicle collision to a determination that a vehicle is involved in or about to be involved in an event. In such examples, the machine learning algorithms may be able to predict an event is about to occur in future situations. Of course, other subsets of data may be applied such as speed of vehicles, environmental conditions, time of the day, location of vehicles, vehicle control status information, driver behavior information, vehicle on-board telematics data or any combination thereof.

Machine learning may be applied, as disclosed herein, to identify specific conditions that lead to events from a vehicle's perspective. Predictive behaviors may be determined to avoid and/or reduce the severity of future events. For example, the example machine learning algorithms may be "trained" with camera feeds and/or image recognition data corresponding to previous vehicle collisions and/or one or more vehicle collision simulations such that the example event detector 110 may predict, with high accuracy, that an event (e.g., accident) is about to occur and/or is occurring in order to avoid and/or reduce the severity of the event.

In response to determining the occurrence of the event, the example event detector 110 may receive collected data from one or more vehicle operation sensors from one or more vehicles before, during, and after the event. In some examples, only data from a threshold amount of time before the event is stored. For example, data may be stored in 5 minute intervals and overwritten every 5 minutes until an event occurs, upon which the 5 minutes before the event would be stored. In such a way, data storage space may be saved because it may be unlikely that data from more than 5 minutes before an event would provide relevant information. Likewise, only data from a threshold of time after the event may be stored. As described above, it may be unlikely that data from more than 5 minutes after an event would provide relevant information. Of course, any threshold amount of time may be used without departing from the scope of this disclosure.

The collected data may be transmitted from the first vehicle 104 to the event detector 110 via the network 108. Additionally, or alternatively, the event identifying and processing platform 102 may be installed on the first vehicle 104 and the event detector 110 may be in direct communication with the one or more vehicle operation sensors and acquire data in this manner. The data may include the date, time, speed of vehicles involved in the event, vehicle identification number, license plate information, route/location of the event (e.g., latitude and longitude, address, street, intersection, etc.), sensor and imagery data, whether one or more vehicle components were working properly prior to the event, whether safety features are equipped/activated in a vehicle, NHTSA level of autonomy of the vehicle, whether the vehicle or driver was in control of the vehicle, communications from the vehicle to the driver, known driving conditions, known weather conditions, insurance policy, provider, and/or coverage information, type of damage, severity of damage, condition of the vehicle, insured/vehicle owners, number of passengers, whether seat belts were utilized, passenger weight, vehicle braking, estimate cost to replace/repair damage, etc.

The example fault and causation identifier 112 may determine, from the collected data, a causation of the event and distribute fault accordingly. Causation may be anything from faulty vehicle components, faulty repairs, faulty design, driver error, faulty infrastructure, weather conditions, etc. The example fault and causation identifier 112 may allocate fault to one or more vehicles, infrastructure, environmental conditions, etc. For example, if the data from the first vehicle 104 and/or the second vehicle 106 indicates the vehicles are at a location associated with a four way stop sign and if the data from the first vehicle 104 indicates a rapid acceleration from a stop and the data from the second vehicle 106 indicates a constant velocity and/or does not indicate any change in acceleration, the example fault and causation identifier 112 may determine that the second vehicle 106 ran a stop sign. In such an example, the second vehicle 106 running the stop sign (i.e., driver error) may be determined to be the cause of the event and may be allocated 100% fault. Further information may be determined from the data such as, for example, mechanical and/or electrical failure of the brakes of the second vehicle 106. In such an example, the mechanical and/or electrical brake failure may be determined to be the cause of the event and may be allocated 90% fault, while the driver of the second vehicle 106 may be allocated 10% fault for failing to test the brakes prior to the event.

In some examples, the example fault and causation identifier 112 may query the event database 124 for previous events similar to the event (e.g., an event at a same location, an event with a same vehicle, an event with a same environmental or infrastructural condition, etc.) to determine a causation or fault trend. For example, the example fault and causation identifier 112 may determine that a plurality of events have occurred at the event location, and the cause of each event was a pothole. Accordingly, the existence of the pothole may similarly be the cause of the present event. Similarly, a previous event similar to the event may indicate that the stop sign in which the second vehicle 106 ran was destroyed or otherwise removed. In such an example, the missing stop sign may be determined to be the cause of the event and the entity that removed the stop sign and/or failed to replace the stop sign in a threshold amount of time may be allocated 100% fault. Of course, other causations may be determined such as, for example, potholes, broken traffic signal, weather, debris, etc. In some examples, the fault and causation identifier 112 utilizes one or more machine learning algorithms to determine causes of particular events and match the causes to corresponding at-fault entities, using the data collected corresponding to an event, previous events, one or more previous event causations, and/or one or more vehicle collision simulations. Data from other events from the event database 124 may be included to support a cause or fault determination.

The example reaction processor 114 may identify any reactions taken in response to an event and may determine whether such reactions were successful in avoiding and/or reducing the severity of the event. For example, vehicles that avoid and/or reduce the severity of the event by swerving left or swerving right in a threshold amount of time may still provide event data indicating the reactions taken and whether the event was successfully avoided and/or the severity of the event was reduced (e.g., the severity of a collision where the brakes were applied one second before the collision may be lower than the severity of a collision where no brakes were applied). In some examples, the example reaction processor 114 generates an avoidance maneuver instruction based on previous successful event avoidance maneuvers. In some examples, the example reaction processor 114 issues, to one or more vehicles approaching an event, the generated avoidance maneuver instructions in response to determining a new event or predicted event is similar to previously avoided event. In some examples, the reaction processor 114 utilizes machine learning algorithms (e.g., neural networks, decision trees, etc.) to match avoidance maneuver instructions with new events.

Additionally, or alternatively, the example reaction processor 114 may determine, based on the collected data and/or additional data from the event database 124, one or more reactionary measures in response to an event. For example, the example reaction processor 114 may determine that the event has caused the location where the event occurred to be impassible and the example reaction processor 114 may determine an instruction should be transmitted to other vehicles to avoid the event location. The example reaction processor 114 may communicate to vehicles in the proximity of an event that a lane or lanes on the highway should be cleared for emergency vehicles. For example, the reaction processor 114 may display a message on a nearby digital billboard and/or display a message via on-board displays within vehicles in proximity to the event.

The example reaction processor 114 may, for example, determine a location is impassible by collecting range sensor data from one or more vehicles involved in an event and determining whether distances between other vehicles/infrastructure objects (e.g., a median, a curb, a highway divider, etc.) and the vehicle is large enough through which other vehicles may pass. Additionally, or alternatively, impassibility may correspond to the severity of the damage to the one or more vehicles involved in the event. For example, a fender-bender may not be sufficient to reroute other vehicles. However, vehicles may be rerouted when one or more vehicles involved in the event is totaled. Accordingly, in some examples, the example reaction processor 114 may determine that it should communicate, to all vehicles on route to the location, an instruction to update the vehicles' global positioning system to avoid the event.

Additionally, reactionary measures may be initiated as a result of the causation determination. The example reaction processor 114 may determine a causal trend in events at a location based on the data in the event database 124 and, based on the causal trend, the example reaction processor 114 may determine an action to be taken to eliminate the causation. One or more reactionary measures may be programmed into a set of rules, wherein each rule may comprise one or more criteria against which the collected data may be compared. If the collected data satisfies the one or more criteria for a given rule, the example reaction processor 114 may identify the associated reactionary measure to be taken. For example, if it is determined that a threshold number of different vehicles spin-out and cause events at a particular location, the example reaction processor 114 may determine that the slope/angle of the road may need to be adjusted to avoid such spin-outs. If a threshold number of events occur at an intersection with a yield sign, the example reaction processor 114 may determine the yield signed should be changed to a stop sign. If a threshold number of events occur in a turning lane when the traffic signal is changing, the example reaction processor 114 may determine a green turn arrow should be installed and/or the green turn arrow should be longer to fully empty the turn lane and avoid any last minute turning that may lead to events.

The example event processor 116 may aggregate the collected data, determine if the data is redundant, determine if the data is accurate, determine if additional data is needed, determine the extent of any damage to vehicles or infrastructure devices, determine repair or replacement costs, generate reports, generate insurance claims, process insurance claims, etc. The example event processor 116 may determine the amount of data that is collected, stored, processed, and/or transmitted based on the severity of the event and/or damage to the vehicles/infrastructure. For example, a minimum amount of information may be collected, stored, processed, and/or transmitted when a vehicle hits a pothole or is involved in a fender-bender. In contrast, when one or more vehicles or infrastructure devices are totaled, a maximum amount of data may be collected, stored, processed, and/or transmitted. Similarly, insurance claims may be classified, based on the severity of the event, as minor, major, total loss, or whatever classification is appropriate.

To determine the extent of damage to a vehicle, the event processor 116 may compare data from one or more sensors of a vehicle prior to an event to data from the one or more sensors of the vehicle during and/or after the event to determine any changes to the structure of the vehicle. Such changes may reflect damage done to a vehicle during the event. For example, the event processor 116 may identify functioning sensors prior to an event and determine non-functioning sensors after an event to determine damage to a particular area of a vehicle or infrastructure object. In some examples, impact sensors may be disposed at various locations of a vehicle and may report the forces applied to those various locations in order to determine a magnitude of damage to those locations. In some examples data from an on-board diagnostic system of the vehicle may be used to determine the status of various components of the vehicle and the magnitude of damage to those components. In some examples, external cameras on one or more vehicles involved in or in the vicinity of the event may identify external damage visually and damage estimates may be performed based on the visual camera data. The example event processor 116 may determine how much damage is done to which portions of the vehicle (and similarly to connected infrastructure devices). The example event processor 116 may utilize one of more machine learning algorithms to classify the extent of the damage (high, medium, low etc.) using the data from one or more sensors of the vehicle, data from previous events from the event database 124, and/or one or more collision simulations.

To determine the cost of repairs or replacement parts corresponding to the damage, the event processor 116 may communicate with one or more repair/replacement services for costs involved in repairing such damage. Additionally, or alternatively, the example event processor 116 may identify similar damage to vehicles in past events by querying the event database 124 and determining a cost for similar repairs/replacements. For example, sensor data from similar previous events may be aggregated to provide a severity model that is associated with repair costs. Additionally, images from vehicles and/or infrastructure devices may be used as visual correlations to the severity of damage and associated costs.

In some examples, the event processor 116 may compare the damage and/or costs of repairs/replacements to a threshold to determine whether it is even necessary to initiate an insurance claim or inform relevant entities. For example, a vehicle may hit a pothole and the event detector 110 may determine the hitting of the pothole is significant enough to identify as an event. However, based on the data collected before, during, and after hitting the pothole, the event processor 116 may determine that insignificant damage has occurred, and thus there is no need to involve additional parties.

The example communication link device 118 may send and/or receive data from other responsive devices, which may form an ad-hoc network of responsive devices (e.g., connected vehicles, connected traffic signals, traffic cameras, automatic telling machine cameras, infrastructure devices, etc.) described herein. The example communication link device 118 may send and/or receive data to one or more personnel including emergency services (e.g., EMTs, fire department, hospital staff, etc.), authorities (e.g., police), repair services (e.g., vehicle repair shops, infrastructure repair contractors, etc.), rental vehicle services, towing services, entities related to drivers of one or more vehicles (e.g., family members associated with insurance plan), insurance providers, etc. In some examples, the communication link device 118 might not send data based on whether the event processor 116 determines the event is significant enough (e.g., above a damage, cost, or the like, threshold) to involve additional entities.

The sent data may be in report form as generated by the example event processor 116. In some examples, the event report may be part of an application programming interface (API) that is accessible to multiple entities, vehicles, infrastructure devices, investigators, responders, etc. In such examples, the event report may be created or supplemented via multiple party collaboration. In some examples, the communication link device 118 transmits an insurance claim to an insurance provider (e.g., an insurance provider of the at-fault party and/or an insurance provider of the other parties). In such examples, the insurance claim may include the event report and/or documentation supporting the cause and fault determinations. For example, other similar event data from the event database 124 may be included as supporting material.

The example vehicle database 120 may be a computer readable storage medium or memory that stores vehicle identification information, driver identification information, and/or insurance information associated with a vehicle. In some examples, the vehicle database 120 may include information about additional parties related to the driver such as, for example, family members that may or may not be covered by the insurance policy associated with the vehicle. In some examples, the vehicle database 120 comprises the insurance coverage and a digital certificate. The example digital certificate may comprise information regarding the circumstances in which the insurance coverage would pay out compensation. Such a digital certificate may be exchanged between entities involved in an event so that the entities may automatically process compensation to repair/replace damages sustained during the event.

The example event database 124 may be a computer readable storage medium or memory that stores information associated with a plurality of previous events and/or event simulations. The event database 124 may include previous event reports detailing dates, times, speeds of vehicles involved in the event, vehicle identification numbers, license plate information, routes, locations of the events (e.g., latitude and longitude, address, street, intersection, etc.), sensor and imagery data, whether safety features were equipped/activated in a vehicle, NHTSA level of autonomy of the vehicle, whether the vehicle or driver was in control of the vehicle, communications from the vehicle to the driver, driving conditions, weather conditions, insurance coverage information, event reports, infrastructure devices data, insurance claim information (e.g., whether a claim was submitted, whether the claim was settled, the time taken to settle the claim, etc.), type of damage, severity of damage, parties informed (e.g., EMTs, insurance entities, infrastructure repair services, etc.), condition of the vehicle, insured/vehicle owners, number of passengers, whether seat belts were utilized, passenger weight, vehicle braking, estimate cost to replace/repair damage, etc. Such data may be used by one or more machine learning algorithms for identification of new events, determining causes of the events, associated fault to entities involved in the event, determining reactionary measures, etc.

Figure 2:
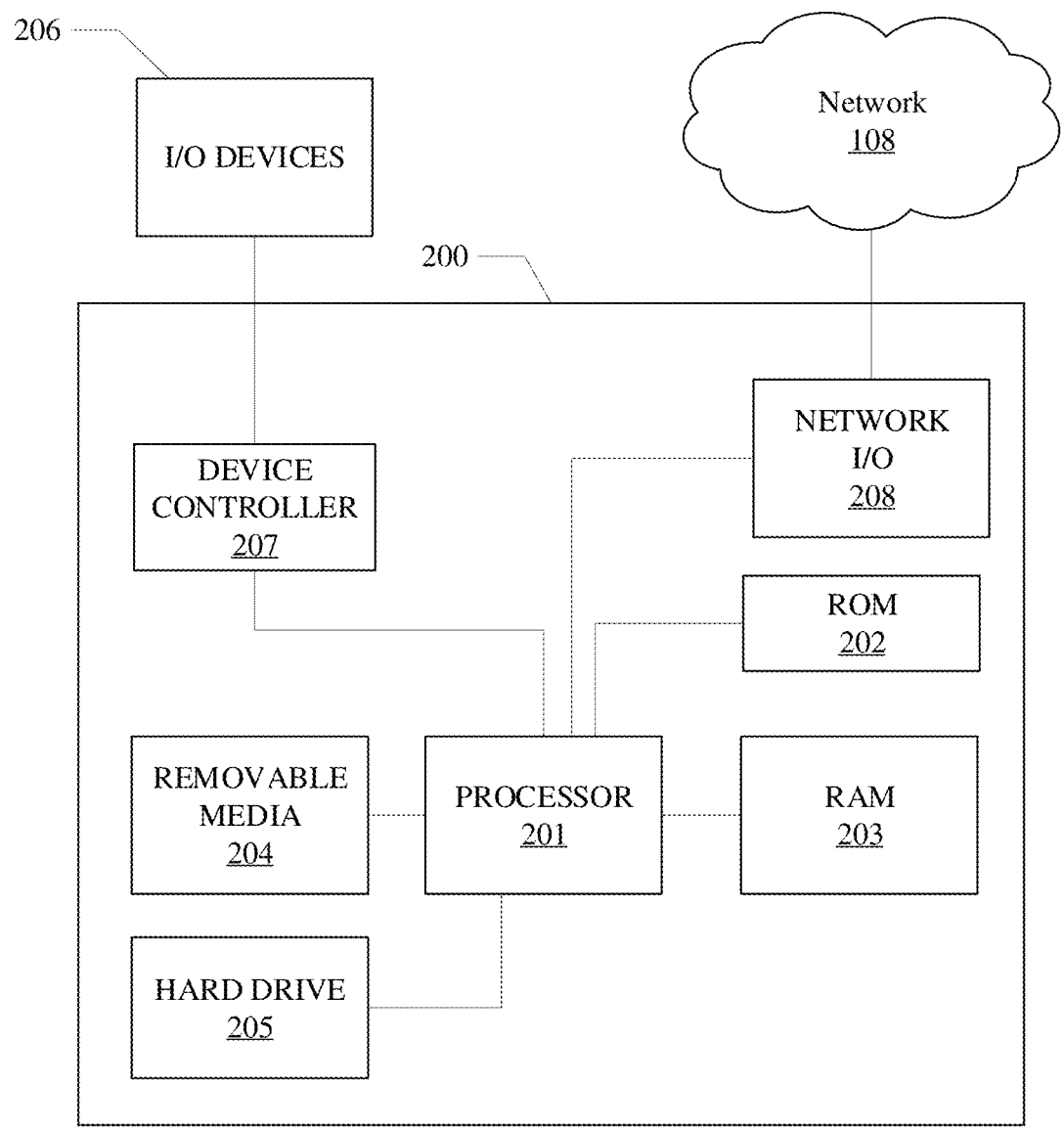
FIG. 2 illustrates an example computing device specifically configured to at least perform the method of FIG. 4 in accordance with one or more aspects described herein.

The example event detector 110, the example fault and causation identifier 112, the example reaction processor 114, the example event processor 116, the example communication link device 118, the example vehicle database 120, and/or more generally, the event identifying and processing platform 102, the example event database 124, and/or other computing devices described herein may each be implemented via a hardware platform such as, for example, the computing device 200 illustrated in FIG. 2. In some examples, the computing device 200 may implement the example event detector 110, the example fault and causation identifier 112, the example reaction processor 114, the example event processor 116, the example communication link device 118, the example vehicle database 120, and the example event database 124, such that all elements are incorporated into a single device. Some elements described with reference to the computing device 200 may be alternately implemented in software. The computing device 200 may include one or more processors 201, which may execute instructions of a computer program to perform any of the features described herein. The instructions may be stored in any type of tangible computer-readable medium or memory, to configure the operation of the processor 201. As used herein, the term tangible computer-readable storage medium is expressly defined to include storage devices or storage discs and to exclude transmission media and propagating signals. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more input/output devices 206, such as a display, touch screen, keyboard, mouse, microphone, software user interface, etc. The computing device 200 may include one or more device controllers 207 such as a video processor, keyboard controller, etc. The computing device 200 may also include one or more network interfaces 208, such as input/output circuits (such as a network card) to communicate with a network such as the example network 108. The network interface 208 may be a wired interface, wireless interface, or a combination thereof. One or more of the elements described above may be removed, rearranged, or supplemented without departing from the scope of the present disclosure.

FIGS. 3A-3E illustrate diagrams of an example intersection 300 wherein one or more vehicles are involved in or in the vicinity of an event. For example, a first vehicle 302 may be turning left and may collide with a second vehicle 304 traveling straight, causing an event 306. As disclosed herein, each of the first vehicle 302 and the second vehicle 304 may comprise one or more vehicle operation sensors. As illustrated in FIGS. 3A-3E, the one or more vehicle operation sensors may create sensory areas for the one or more vehicles. For example, the first vehicle 302 may have a first sensory area 308 and the second vehicle 304 may have a second sensory area 310. While the first sensory area 308 and the second sensory area 310 are depicted as circles, the first sensory area 308 and the second sensory area 310 may be any shape (e.g., square, rectangular, free-form, etc.). As further illustrated in FIG. 3A, the first sensory area 308 may extend into areas of the intersection 300 in which the second sensory area 310 does not, the second sensory area 310 may extend into areas of the intersection 300 in which the first sensory area 308 does not, and/or the first sensory area 308 may extend into areas of the intersection 300 in which the second sensory area 310 also extends.

In the illustrated example, each of the first vehicle 302 and the second vehicle 304 may comprise an event identifying and processing platform 102. As a result of the event 306, the first vehicle 302 may attempt communication with the second vehicle 304 (e.g., V2V communications) and any other responsive objects in the vicinity of the event 306 (e.g., V2I communications). If communication is successful, the first vehicle may communicate its collected data corresponding to the first sensory area 308 to at least the second vehicle 304. Similarly, the second vehicle 304 may communicate its collected data corresponding to the second sensory area 310 to at least the first vehicle 302. Additionally, or alternatively, both the first vehicle 302 and the second vehicle 304 may communicate its collected data to a remote event identifying and processing platform 102. In either case, the event identifying and processing platform 102 may collect data corresponding to the first sensory area 308 and/or the second sensory area 310 to determine a cause of the event, an at-fault party, whether an insurance claim should be initiated and by whom, etc. as disclosed herein.

Figure 3A:
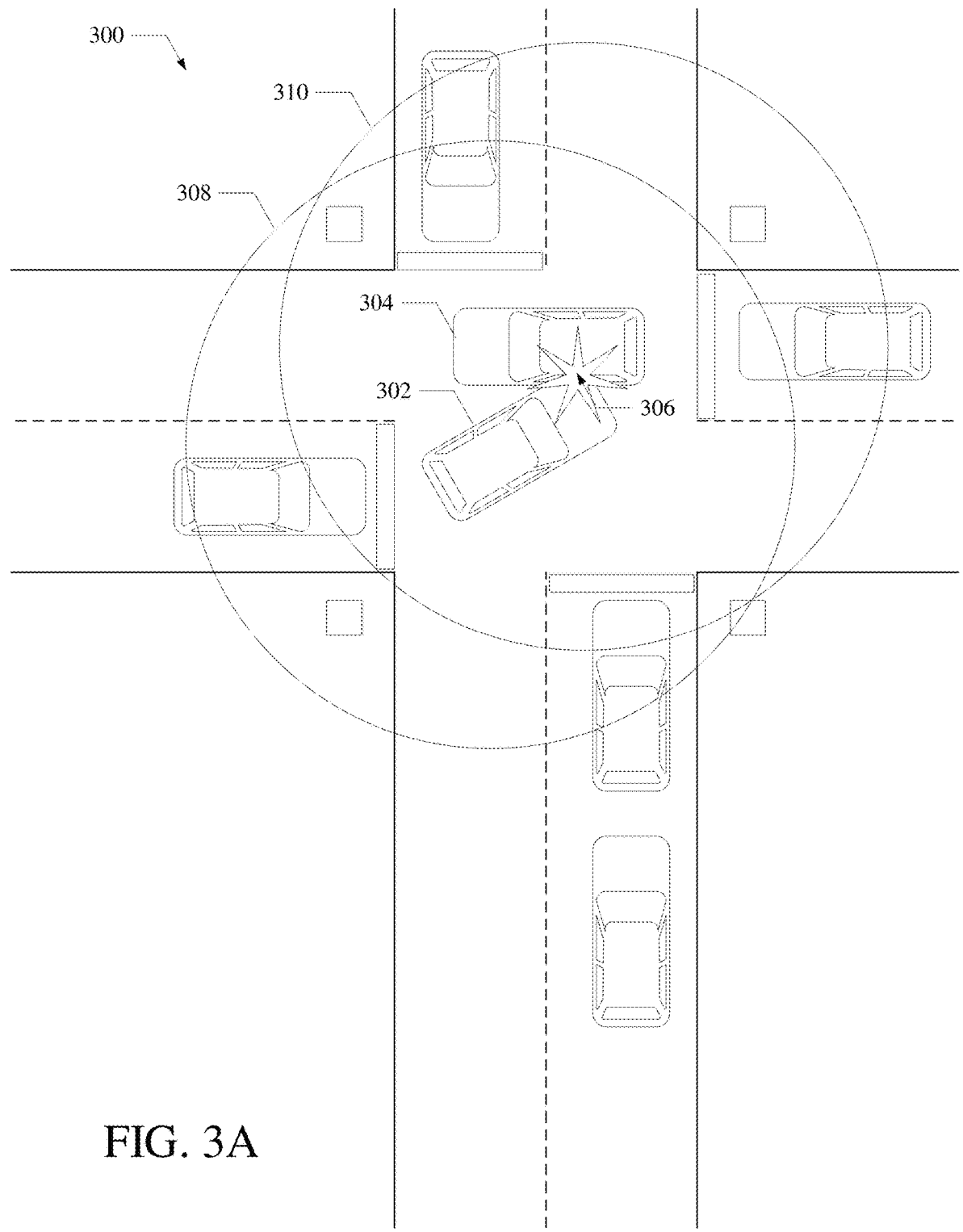
FIGS. 3A-3E illustrate diagrams of an example intersection wherein one or more vehicles are involved in or in the vicinity of an event in accordance with one or more aspects described herein.
Figure 3B:
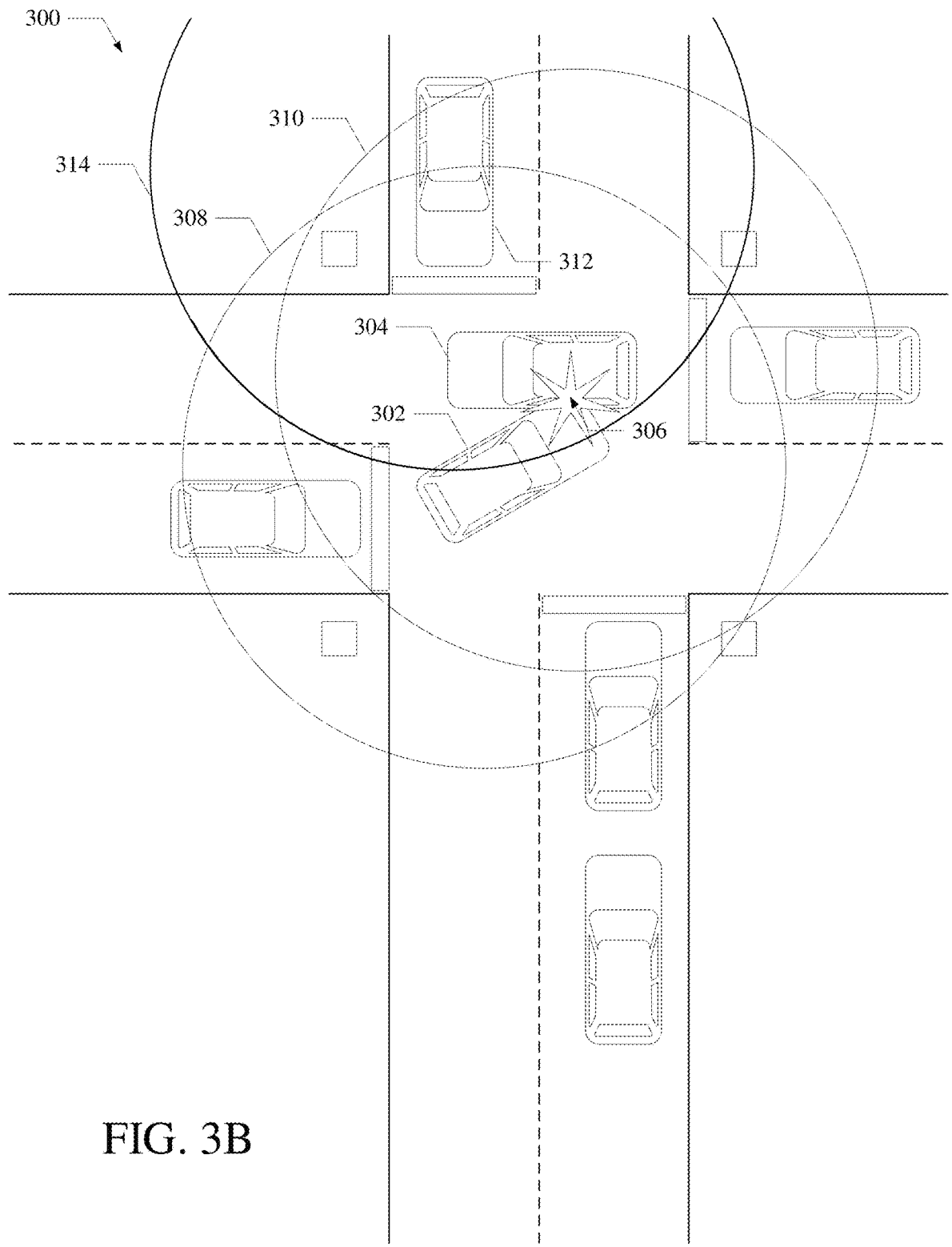
Figure 3C:
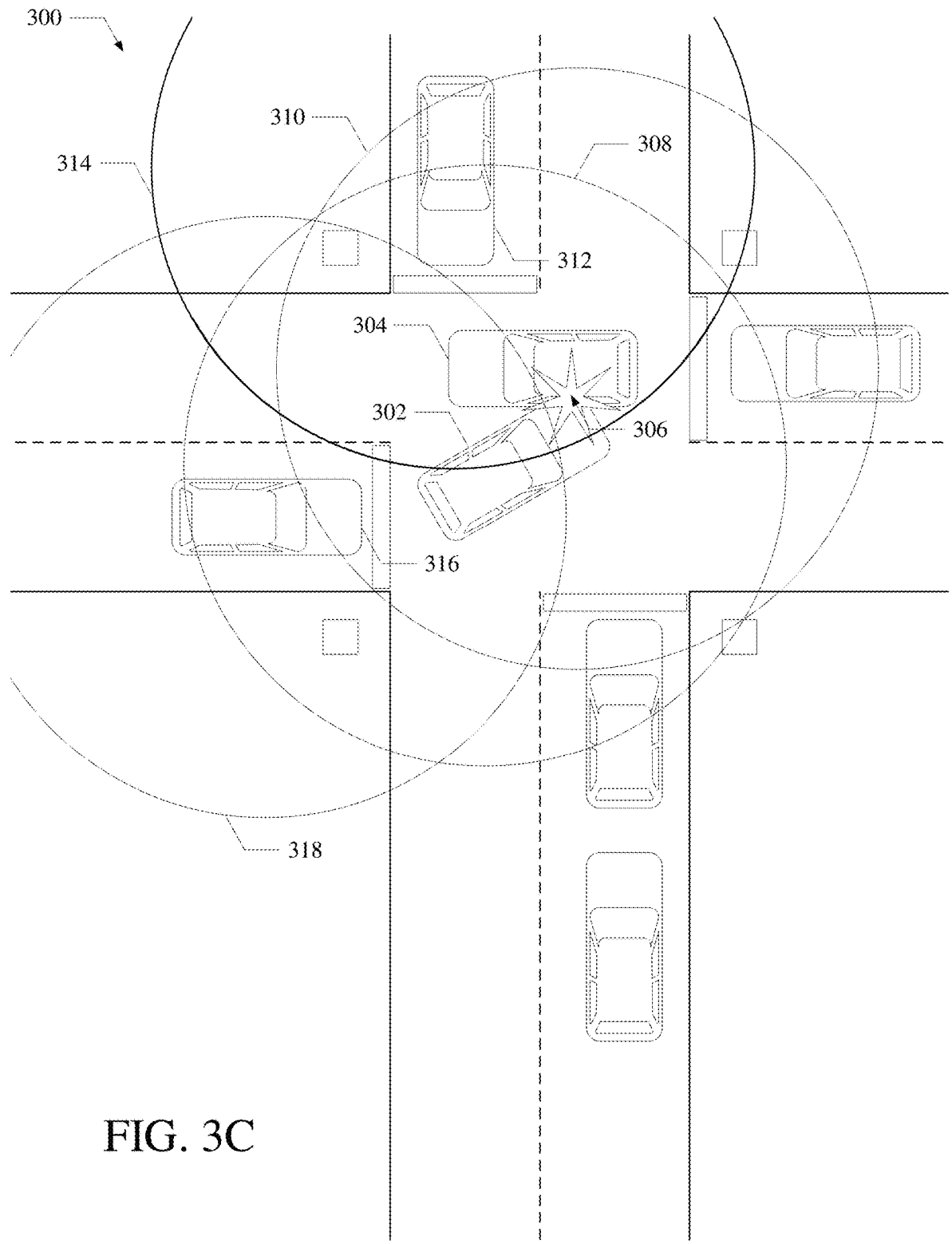
Figure 3D:
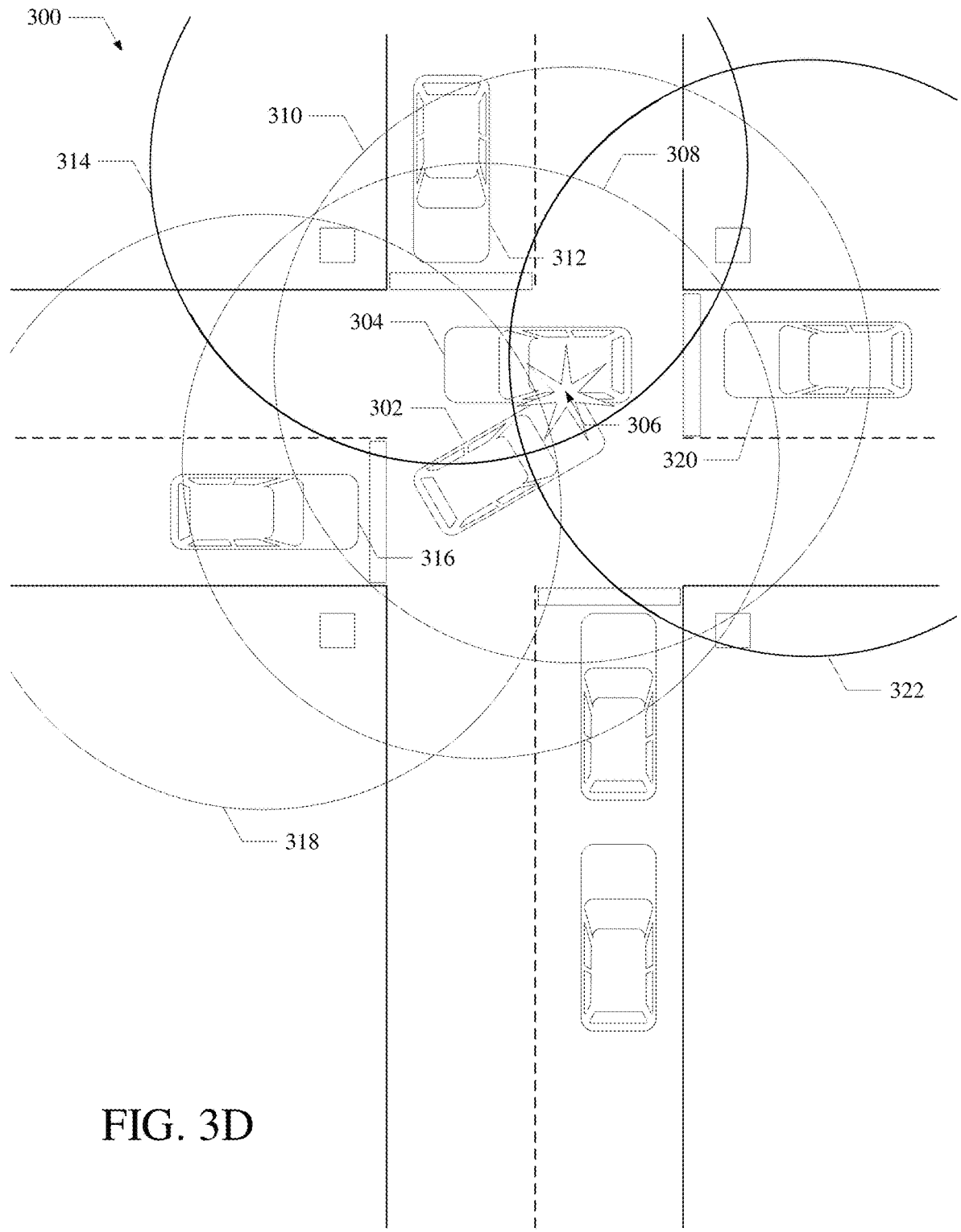

In some examples, other responsive objects may be in the vicinity of the event 306. For example, in FIG. 3B, a third vehicle 312 with a corresponding third sensory area 314 may be able to communicate its collected data corresponding to the third sensory area 314 to the first vehicle 302 and/or the second vehicle 304. In FIG. 3C, a fourth vehicle 316 with a corresponding fourth sensory area 318 may be able to communicate its collected data corresponding to the fourth sensory area 318 to the first vehicle 302, the second vehicle 304, and/or the third vehicle 312. In FIG. 3D, a fifth vehicle 320 with a corresponding fifth sensory area 322 may be able to communicate its collected data corresponding to the fifth sensory area 322 to the first vehicle 302, the second vehicle 304, the third vehicle 312, and/or the fourth vehicle 316.

Figure 3E:
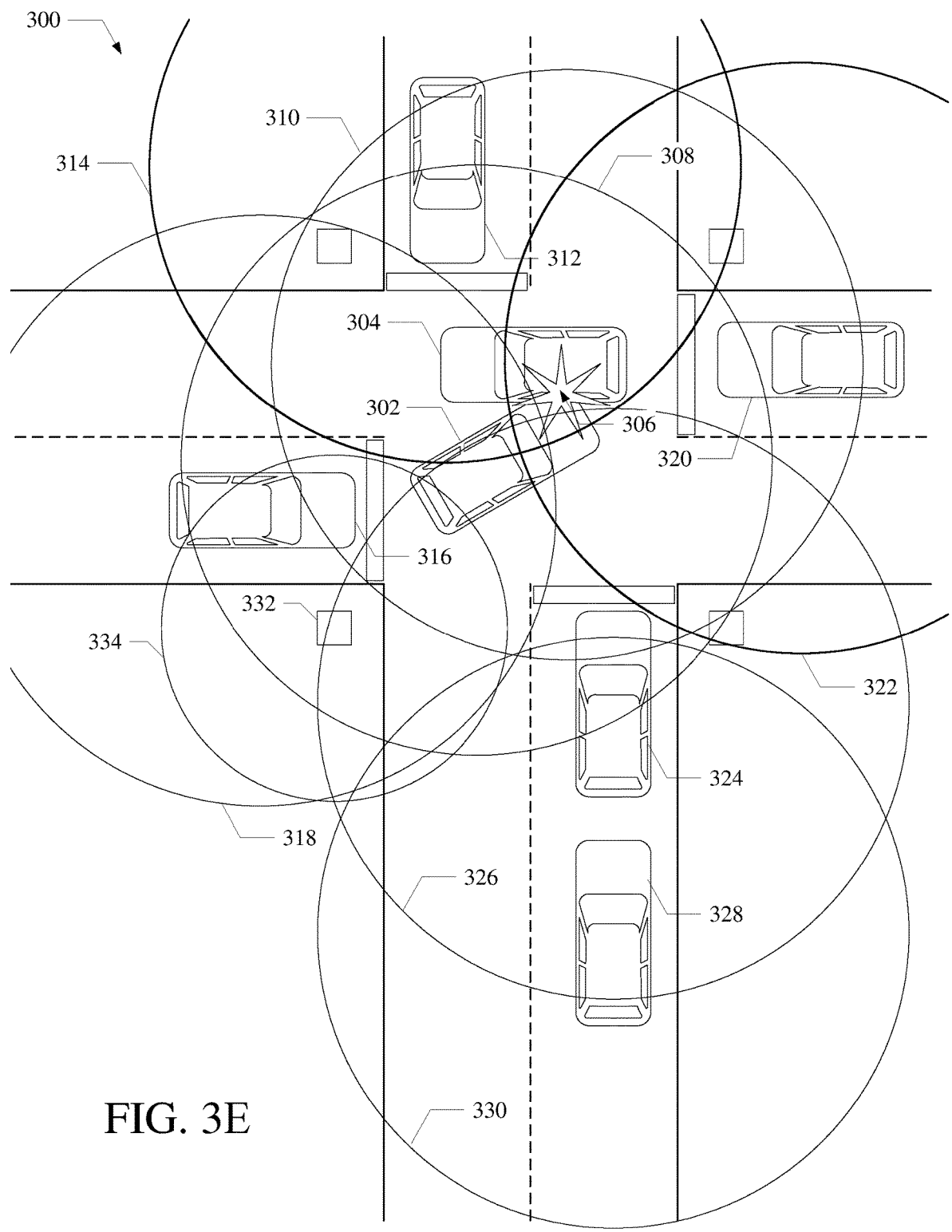

In FIG. 3E, a sixth vehicle 324 with a corresponding sixth sensory area 326 and a seventh vehicle 328 with a corresponding seventh sensory area 330 may be able to communicate their collected data corresponding to the sixth sensory area 326 and the seventh sensory area 330 to the any of the vehicles 302, 304, 312, 316, 320, 324, 328. Additionally, or alternatively, one or more infrastructure devices 332 (e.g., a connected traffic signal) with a corresponding sensory area 334 may communicate its collected data corresponding to the sensory area 334 to the any of the vehicles 302, 304, 312, 316, 320, 324, 328. Similarly, any of the vehicles 302, 304, 312, 316, 320, 324, 328 may communicate its collected data to the one or more infrastructure devices 332. In such examples, the one or more infrastructure devices 332 may react, based on the collected data, to the event 306. For example, the one or more infrastructure devices 332 may change all traffic signals to red (continuous red or flashing red), allow left and/or right turns but no green light, etc. in order to alleviate traffic congestion.

In some examples, all data from all vehicles 302, 304, 312, 316, 320, 324, 328 and infrastructure devices 332 may be collected in response to the event 306. Alternatively, as the event identifying and processing platform 102 begins to aggregate data collected from one or more vehicles and/or infrastructure devices, the event identifying and processing platform 102 may determine whether additional information is required and may query other vehicles and/or infrastructure devices in the vicinity of the event for such additional information.

As illustrated in FIGS. 3A-3E, an ad-hoc network of vehicles and infrastructure devices may be created to aggregate data from multiple perspectives as a result of an event. The aggregated data may be presented as an overview of the event with each perspective. Additionally, or alternatively, data from each vehicle and infrastructure device may be presented individually to focus on individual perspectives. In some examples, data from multiple perspectives may be redundant. In some examples, such data from multiple perspectives may allow the identification of phantom entities. A phantom entity may be an entity that ultimately caused an event to occur, but is otherwise not directly involved in the event. In such examples, the phantom entity may not be in the vicinity of an event caused by the phantom entity. However, the above disclosed ad-hoc network may continually expand outwardly from the event so long as additional vehicles and/or infrastructure devices are within range of other vehicles and/or infrastructure devices. Machine learning algorithms may be used to determine an optimal range for the ad-hoc network to expand before all data collected is redundant or irrelevant.

Figure 4:
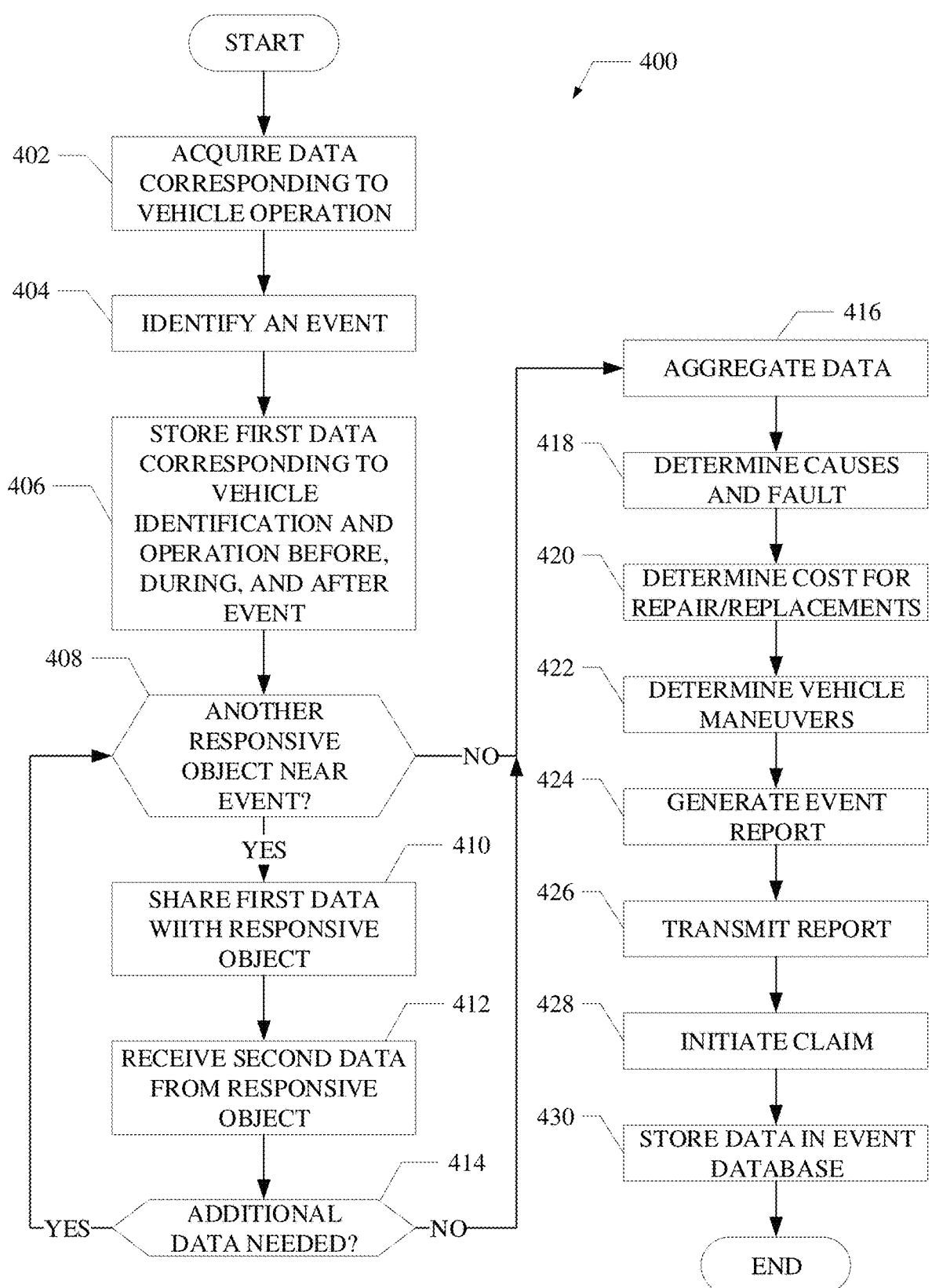
FIG. 4 is a flow chart illustrative of a process for implementing an example event-based connected vehicle control and response system in accordance with one or more aspects described herein.

FIG. 4 illustrates a flow chart illustrating a process for implementing an example event-based connected vehicle control and response system in accordance with one or more aspects described herein. In some examples, the process may be executed via machine readable instructions that, when executed, may cause an event identifying and processing platform 102 in a vehicle (e.g., first vehicle 302 (FIG. 3)) to implement a process 400. The example process 400 begins at block 402, wherein one or more sensors are recording or otherwise collecting data corresponding to the vehicle's operation. As disclosed herein, the amount of data that is collected, stored, processed, and/or transmitted may be proportionate to the severity of the event. In some examples, the frequency of data collection may also vary. For example, sensor data may be collected periodically at predetermined intervals, continuously, may be monitored continuously and only collected (i.e., recorded) upon the occurrence of an event, etc. In some examples, all sensor data may be continuously collected, but only sensor data corresponding to event detection may be continuously analyzed until an event occurs. Thereafter, all data may be analyzed (e.g., serially, in parallel, on-demand, etc.) in order to conserve on-vehicle or on-infrastructure device computing resources.

At block 404, the example event detector 110 identifies an event, such as, for example, event 306 (FIG. 3). At block 406, the example event detector 110 stores first data corresponding to the identification of the vehicle and its operation before the event, during the event, and after the event. For example, the example event detector 110 may query the vehicle database 120 for driver and insurance provider information associated with the first vehicle 302. Additionally, the example event detector 110 may collect the sensor data for the first vehicle 302 surrounding the event 306. At block 408, the example communication link device 118 may determine whether there is another responsive object near the event (e.g., second vehicle 304, infrastructure device 332, etc.). For example, the example communication link device 118 may send out a ping and wait for a reply. If the example communication link device 118 determines that there is another responsive object near the event (block 408: YES), control proceeds to block 410.

At block 410, the example communication link device 118 (of the first vehicle 302) may share the first data with the responsive object (e.g., second vehicle 304), e.g., via vehicle-to-vehicle communications, vehicle-to-infrastructure communications, or the like. At block 412, the responsive object may transmit back second data, which the example communication link device 118 (of the first vehicle 302) may receive. At block 414, the example event processor 116 may determine whether additional data is needed. If additional data is needed (block 414: YES), control returns to block 408.

As disclosed herein, the example process 400 may loop between blocks 408 and 414 so long as there are responsive objects within range of at least one vehicle or infrastructure device and/or the data acquired by such responsive objects is non-redundant. In such a manner, large vehicle and/or infrastructure device ad-hoc networks may be formed that share data from multiple perspectives such that fault determinations and reactionary measures may be determined with high accuracy. If additional data is not needed (block 414: NO), or if at block 408, the example communication link device 118 determines that there is no other responsive object near the event (block 408: NO), control proceeds to block 416. At block 416, the example event processor 116 aggregates the collected data. In some examples, the example event processor 116 eliminates redundant information. In some examples, redundant information may be used to verify accuracy of the collected data.

At block 418, the example fault and causation identifier 112 analyzes the aggregate data to determine causes of the event 306 and/or determine fault. As disclosed herein, causation may be assigned to a single cause or may be associated with numerous causes. In some examples, the example fault and causation identifier may query event database 124 and use machine learning algorithms to determine the causes of the event 306 and/or determine fault. As disclosed herein, fault may be assigned to a single party (e.g., 100% at fault) or may be distributed amongst the parties involved in the event 306 (e.g., first vehicle 302 is 20% at fault, second vehicle 304 is 70% at fault, another vehicle is 10% at fault, etc.).

At block 420, the example event processor 116 may determine the cost for repairing any damage and/or replacing any components of vehicles and/or any components of infrastructure. For example, the event processor 116 may compare data from one or more sensors of a vehicle prior to an event to data from the one or more sensors of the vehicle during and/or after the event to determine any changes to the structure of the vehicle. Such changes may reflect damage done to a vehicle during the event. The example event processor 116 may determine how much damage is done to which portions of the vehicle (and similarly to connected infrastructure devices). The event processor 116 may communicate with one or more repair/replacement services for costs involved in repairing such damage. Additionally, or alternatively, the example event processor 116 may identify similar damage to vehicles in past events by querying the event database 124 and determining a cost for similar repairs/replacements.

At block 422, the example reaction processor 114 may determine, based on the aggregate data, one or more vehicle maneuvers to avoid and/or reduce the severity of the event 306. In some examples, the reaction processor 114 may determine, based on the aggregate data, reactionary measures to prevent events before they occur (e.g., fix a pothole, add a traffic signal, etc.). As disclosed herein, the example communication link device 118 may transmit such vehicle maneuvers to one or more vehicles within the vehicle and/or infrastructure device ad-hoc network to inform other vehicles of the event. Autonomous vehicles may receive the one or more vehicle maneuvers and implement them accordingly (e.g., via a vehicle control computing device controlling operation of the autonomous vehicle). Non-autonomous or semi-autonomous vehicles may present the one or more vehicle maneuvers to drivers of the non-autonomous or semi-autonomous vehicles. Accordingly, other vehicles not involved in the event may be instructed to avoid the event and/or similar events based on the data collected by the vehicles involved in the event.

At block 424, the example event processor 116 generates, based on the aggregate data, causes, faults, repair/replacement costs, and/or determined reactionary measures, an event report. The example event processor 116 may format the event report as a police report. Alternatively, the event report may be formatted to report the aggregated data in a user-friendly way. At block 426, the example communication link device 118 transmits the report to any number of parties including, without limitation, emergency personnel, local authorities, infrastructure repair services, automobile repair services, insurance services, automobile towing services, infrastructure clearing services, etc.

At block 428, the example event processor 116 may initiate an insurance claim for an insurance provider of the at-fault party(ies). For example, the event processor 116 may utilize the insurance provider information from the vehicle database 120 of the party(ies) at-fault and the event report to generate an insurance claim. In some examples, the communication link device 118 may submit the insurance claim to the insurance provider. In some examples, the event processor 116 may process the insurance claim automatically on site. For example, a vehicle's coverage and promise to pay may be stored as a digital certificate in the vehicle database 120. In response to the fault and causation identifier 112 determining that a vehicle is at-fault, the example communication link device 118 of the vehicle at-fault may transmit the corresponding digital certificate to the other vehicles involved in the event. In some examples, the event processor 116 may process received digital certificates to acquire compensation for any damage or injuries sustained as a result of the event. In some examples, the compensation may be credits for repairs/replacements based on the determinations at block 420.

At block 430, the example communication link device 118 may send, to the event database 124 for storage, the event report and any actions taken associated with the event. For example, the event database 124 may store whether authorities were informed of the event, whether an insurance claim was submitted, whether a submitted insurance claim was settled, how long did it take for the insurance claim to be settled, were infrastructure repair services informed, how long did it take for infrastructure to be repaired after being informed, were vehicle repair services informed, how long did it take for the vehicles to be repaired after being informed, how much did repairs/replacements cost, etc. All such data may be stored in the event database 124 for future use. As disclosed herein, machine learning algorithms may access the event database 124 for input data in respective determinations disclosed herein. Accordingly, as the event database 124 is updated with new information (e.g., as new events occur), the machine learning algorithms may be further trained, validated, and/or refined for improved accuracy. Thereafter, the example process 400 ceases operation.

While process 400 is described referencing an event identifying and processing platform 102 installed in a vehicle, a remote instance of the event identifying and processing platform 102 may similarly perform such operations. For example, the remote instance of the event identifying and processing platform 102 may acquire data from vehicles and infrastructure devices. From which, the remote instance of the event identifying and processing platform 102 may detect an event, determine causation and faults, determine reactions and reactionary measures, process the event data, and transmit reports, claims, etc. to appropriate parties.

As disclosed herein, the systems, methods, and apparatus may initiate, based on the collected data and through an insurance provider of the at-fault party, accurate insurance claims thereby eliminating the need to identify the parties involved in the event and/or the respective insurance providers, reducing negotiation of fault and/or who should submit an insurance claim, reducing duplicative claims from multiple parties involved in an event, reducing the number of parties involved in settling an insurance claim, reducing claim handling costs, reducing fraudulent insurance claims, etc.

Figure 5:
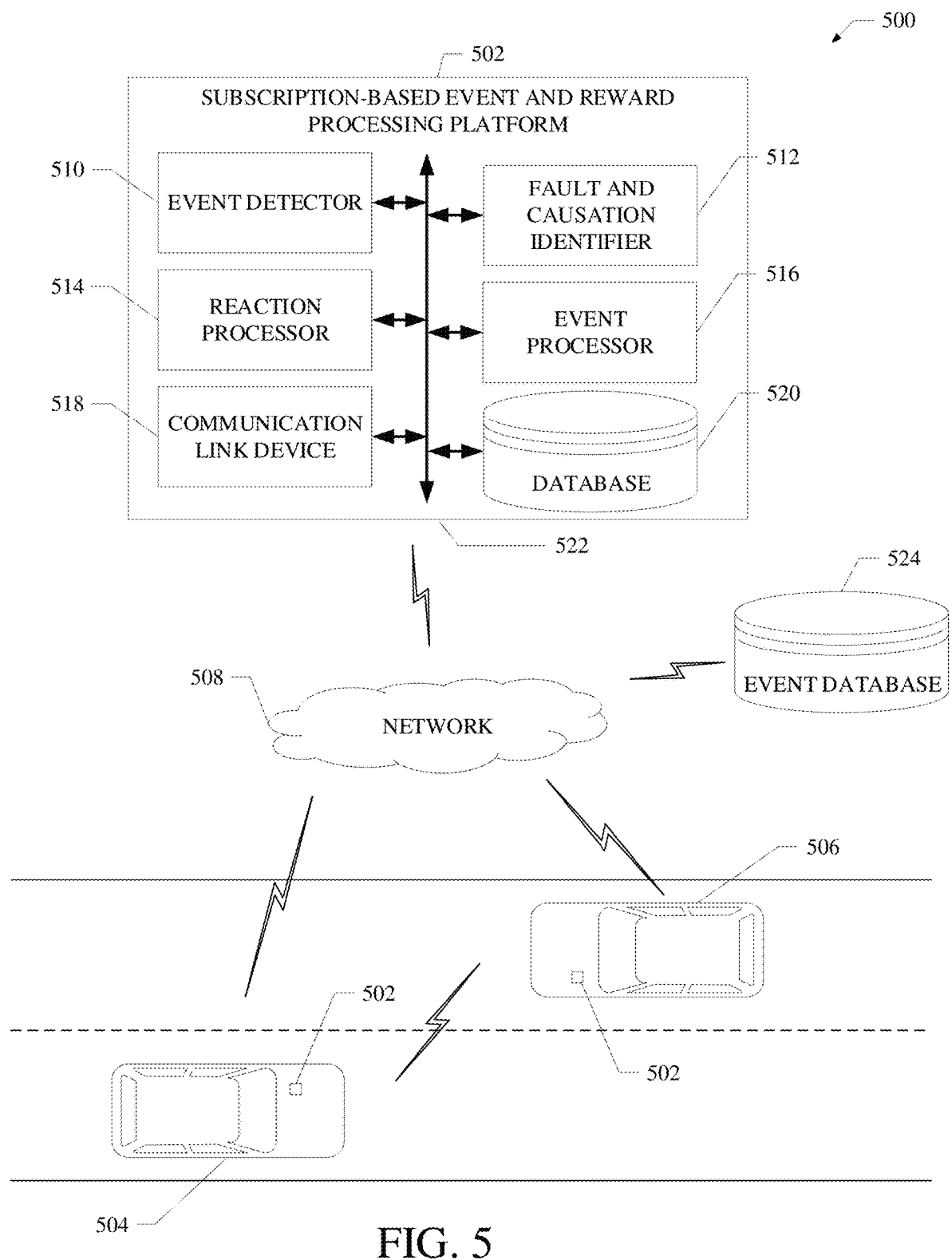
FIG. 5 illustrates an example environment comprising a subscription-based event and reward processing platform in communication with one or more vehicles connected over a network in accordance with one or more aspects described herein.

FIG. 5 illustrates an example environment 500 comprising a subscription-based event and reward processing platform 502 in communication with a first vehicle 504 and/or a second vehicle 506 connected over a network 508. The subscription-based event and reward processing platform 502 may correspond to the event identifying and processing platform 102 as shown in FIG. 1, with the additional features described below. In some examples, the first vehicle 504 and/or the second vehicle 506 are autonomous or semi-autonomous vehicles. The first vehicle 504 may correspond to first vehicle 104 and/or vehicle 302. The second vehicle 506 may correspond to first vehicle 106 and/or vehicle 304. The network 508 may be a cellular network, WI-FI® network, Bluetooth network, near-field communication network, etc. In some examples, the subscription-based event and reward processing platform 502 may be a remote server accessible by the first vehicle 504 and/or the second vehicle 506 via the network 508. Additionally, or alternatively, the first vehicle 504 and/or the second vehicle 506 may comprise the subscription-based event and reward processing platform 502 within or in communication with an on-board computer of the first vehicle 504 and/or the second vehicle 506. As disclosed herein, the first vehicle 504 and/or the second vehicle 506 may be involved in an event (such as event 306) that may damage one or more portions of the first vehicle 504 and/or the second vehicle 506. It may be advantageous for the first vehicle 504 and/or the second vehicle 506 to comprise the subscription-based event and reward processing platform 502 such that network availability does not impact the operations described herein. Accordingly, it may be advantageous for the subscription-based event and reward processing platform 502 to be installed on the first vehicle 504, the second vehicle 506, and as a remote server, as illustrated in FIG. 1. The subscription-based event and reward processing platform 502 may be hosted on a cloud computing platform. The subscription-based event and reward processing platform 502 hosted on the cloud computing platform may communicate with a corresponding subscription-based event and reward processing platform 502 located in the first vehicle 504, and with a corresponding subscription-based event and reward processing platform 502 located in the first vehicle 506.

The example subscription-based event and reward processing platform 502 comprises an example event detector 510, an example fault and causation identifier 512, an example reaction processor 514, an example event processor 516, an example communication link device 518, and an example database 520. The example event detector 510, example fault and causation identifier 512, example reaction processor 514, example event processor 516, example communication link device 518, and example database 520 may correspond to event detector 110, example fault and causation identifier 112, example reaction processor 114, example event processor 116, example communication link device 118, and example vehicle database 120, respectively, and may include additional features. For example, database 520 may include one or more cloud-based storage devices and/or cloud-based servers. These cloud-based storage devices/servers may be in communication with the subscription-based event and reward processing platform 502 via network 508. The example database 520 may be a computer readable storage medium or memory that stores vehicle identification information and/or driver identification information associated with a vehicle.

The example event detector 510, example fault and causation identifier 512, example reaction processor 514, example event processor 516, example communication link device 518, and example database 520 may be connected or otherwise be in communication via a communication channel such as, for example, bus 522. The example subscription-based event and reward processing platform 502, the example first vehicle 504, and/or the example second vehicle 506 may further be in communication with an example event database 524 over the example network 508. In some examples, the event database 524 may be located within the first vehicle 504 and/or the second vehicle 506 such that network unavailability does not impact the operations described herein.

The example event detector 510 may determine the occurrence of an event by the subscription-based event and reward processing platform 502, such as for example, a vehicle collision or a bad driving behavior (such as excessive speeding, tailgating, sudden breaking, or the like). The example event detector 510 may receive data from one or more accelerometers of a vehicle, such as vehicle 504 and/or vehicle 506, configured to detect a deceleration above a threshold. In examples wherein the event is a vehicle collision, the accelerometers may detect a deceleration above a first threshold. In examples wherein the event is a near miss, the accelerometers may detect a deceleration above a second threshold, wherein the first threshold is higher than the second threshold. In such examples, the accelerometers may detect an acceleration subsequent to the deceleration and within a threshold amount of time, which may be indicative of the vehicle slowing in response to the event and accelerating away after avoiding the event. All vehicle operations may be associated with data signatures like those described above (e.g., deceleration followed by acceleration may be associated with coming to a stop without incident, rapid deceleration followed by nothing may be associated with a vehicle collision, etc.).

Additionally, or alternatively, other sensors may be used to similarly detect an event. For example, range sensors may be used to determine when an object occupies the same space as the vehicle (e.g., the object is 0 inches away). Furthermore, one or more cameras may be utilized in combination with image recognition and one or more machine learning algorithms (e.g., decision trees, neural networks, etc.) to "learn" what events (e.g., a vehicle collision) and the moments before the events look like, so that the event detector 510 may make future predictions of when an event is about to occur and/or is occurring.

As used herein, machine learning may include generating one or more models using data from the example event database 524 and one or more algorithms. In some examples, supervised machine learning is utilized, wherein the one or more generated models are presented with inputs and outputs, and the machine learning algorithm determines one or more general rules to maps the inputs to outputs. For example, a subset of the data from the example event database 524, such as, for example, camera data associated with past events, may be used as input data and prediction of occurrence of an event may be identified as the output. From these inputs and output (i.e., a training data set), the machine learning algorithms may be able to map visual indications of a vehicle collision to a determination that a vehicle is involved in or about to be involved in an event. In such examples, the machine learning algorithms may be able to predict an event is about to occur in future situations. Of course, other subsets of data may be applied such as speed of vehicles, environmental conditions, time of the day, location of vehicles, vehicle control status information, driver behavior information, vehicle on-board telematics data or any combination thereof.

Machine learning may be applied, as disclosed herein, to identify specific conditions that lead to events from a vehicle's perspective. Predictive behaviors may be determined to avoid and/or reduce the severity of future events. For example, the example machine learning algorithms may be "trained" with camera feeds and/or image recognition data corresponding to previous vehicle collisions and/or one or more vehicle collision simulations such that the example event detector 510 may predict, with high accuracy, that an event (e.g., accident) is about to occur and/or is occurring in order to avoid and/or reduce the severity of the event.

In response to determining the occurrence of the event, the example event detector 510 may receive collected data from one or more vehicle operation sensors from one or more vehicles before, during, and after the event. In some examples, only data from a threshold amount of time before the event is stored. For example, data may be stored in 5 minute intervals and overwritten every 5 minutes until an event occurs, upon which the 5 minutes before the event would be stored. In such a way, data storage space may be saved because it may be unlikely that data from more than 5 minutes before an event would provide relevant information. Likewise, only data from a threshold of time after the event may be stored. As described above, it may be unlikely that data from more than 5 minutes after an event would provide relevant information. Of course, any threshold amount of time may be used without departing from the scope of this disclosure.

The collected data may be transmitted from the first vehicle 504 to the event detector 510 via the network 508. Additionally, or alternatively, the subscription-based event and reward processing platform 502 may be installed on the first vehicle 504 and the event detector 510 may be in direct communication with the one or more vehicle operation sensors and acquire data in this manner. The data may include the date, time, speed of vehicles involved in the event, vehicle identification number, license plate information, route/location of the event (e.g., latitude and longitude, address, street, intersection, etc.), sensor and imagery data, whether one or more vehicle components were working properly prior to the event, whether safety features are equipped/activated in a vehicle, NHTSA level of autonomy of the vehicle, whether the vehicle or driver was in control of the vehicle, communications from the vehicle to the driver, known driving conditions, known weather conditions, insurance policy, provider, and/or coverage information, type of damage, severity of damage, condition of the vehicle, insured/vehicle owners, number of passengers, whether seat belts were utilized, passenger weight, vehicle braking, estimate cost to replace/repair damage, etc.

The example fault and causation identifier 512 may determine, from the collected data, a causation of the event and distribute fault accordingly. Causation may be anything from faulty vehicle components, faulty repairs, faulty design, driver error, faulty infrastructure, weather conditions, etc. The example fault and causation identifier 512 may allocate fault to one or more vehicles, infrastructure, environmental conditions, etc. For example, if the data from the first vehicle 504 and/or the second vehicle 506 indicates the vehicles are at a location associated with a four way stop sign and if the data from the first vehicle 504 indicates a rapid acceleration from a stop and the data from the second vehicle 506 indicates a constant velocity and/or does not indicate any change in acceleration, the example fault and causation identifier 512 may determine that the second vehicle 506 ran a stop sign. In such an example, the second vehicle 506 running the stop sign (i.e., driver error) may be determined to be the cause of the event and may be allocated 500% fault. Further information may be determined from the data such as, for example, mechanical and/or electrical failure of the brakes of the second vehicle 506. In such an example, the mechanical and/or electrical brake failure may be determined to be the cause of the event and may be allocated 90% fault, while the driver of the second vehicle 506 may be allocated 50% fault for failing to test the brakes prior to the event.

In some examples, the example fault and causation identifier 512 may query the event database 524 for previous events similar to the event (e.g., an event at a same location, an event with a same vehicle, an event with a same environmental or infrastructural condition, etc.) to determine a causation or fault trend. For example, the example fault and causation identifier 512 may determine that a plurality of events have occurred at the event location, and the cause of each event was a pothole. Accordingly, the existence of the pothole may similarly be the cause of the present event. Similarly, a previous event similar to the event may indicate that the stop sign in which the second vehicle 506 ran was destroyed or otherwise removed. In such an example, the missing stop sign may be determined to be the cause of the event and the entity that removed the stop sign and/or failed to replace the stop sign in a threshold amount of time may be allocated 500% fault. Of course, other causations may be determined such as, for example, potholes, broken traffic signal, weather, debris, etc. In some examples, the fault and causation identifier 512 utilizes one or more machine learning algorithms to determine causes of particular events and match the causes to corresponding at-fault entities, using the data collected corresponding to an event, previous events, one or more previous event causations, and/or one or more vehicle collision simulations. Data from other events from the event database 524 may be included to support a cause or fault determination.

The example reaction processor 514 may identify any reactions taken in response to an event and may determine whether such reactions were successful in avoiding and/or reducing the severity of the event. For example, vehicles that avoid and/or reduce the severity of the event by swerving left or swerving right in a threshold amount of time may still provide event data indicating the reactions taken and whether the event was successfully avoided and/or the severity of the event was reduced (e.g., the severity of a collision where the brakes were applied one second before the collision may be lower than the severity of a collision where no brakes were applied). In some examples, the example reaction processor 514 generates an avoidance maneuver instruction based on previous successful event avoidance maneuvers. In some examples, the example reaction processor 514 issues, to one or more vehicles approaching an event, the generated avoidance maneuver instructions in response to determining a new event or predicted event is similar to previously avoided event. In some examples, the reaction processor 514 utilizes machine learning algorithms (e.g., neural networks, decision trees, etc.) to match avoidance maneuver instructions with new events.

Additionally, or alternatively, the example reaction processor 514 may determine, based on the collected data and/or additional data from the event database 524, one or more reactionary measures in response to an event. For example, the example reaction processor 514 may determine that the event has caused the location where the event occurred to be impassible and the example reaction processor 514 may determine an instruction should be transmitted to other vehicles to avoid the event location. The example reaction processor 514 may communicate to vehicles in the proximity of an event that a lane or lanes on the highway should be cleared for emergency vehicles. For example, the reaction processor 514 may display a message on a nearby digital billboard and/or display a message via on-board displays within vehicles in proximity to the event.

The example reaction processor 514 may, for example, determine a location is impassible by collecting range sensor data from one or more vehicles involved in an event and determining whether distances between other vehicles/infrastructure objects (e.g., a median, a curb, a highway divider, etc.) and the vehicle is large enough through which other vehicles may pass. Additionally, or alternatively, impassibility may correspond to the severity of the damage to the one or more vehicles involved in the event. For example, a fender-bender may not be sufficient to reroute other vehicles. However, vehicles may be rerouted when one or more vehicles involved in the event is totaled. Accordingly, in some examples, the example reaction processor 514 may determine that it should communicate, to all vehicles on route to the location, an instruction to update the vehicles' global positioning system to avoid the event.

Additionally, reactionary measures may be initiated as a result of the causation determination. The example reaction processor 514 may determine a causal trend in events at a location based on the data in the event database 524 and, based on the causal trend, the example reaction processor 514 may determine an action to be taken to eliminate the causation. One or more reactionary measures may be programmed into a set of rules, wherein each rule may comprise one or more criteria against which the collected data may be compared. If the collected data satisfies the one or more criteria for a given rule, the example reaction processor 514 may identify the associated reactionary measure to be taken. For example, if it is determined that a threshold number of different vehicles spin-out and cause events at a particular location, the example reaction processor 514 may determine that the slope/angle of the road may need to be adjusted to avoid such spin-outs. If a threshold number of events occur at an intersection with a yield sign, the example reaction processor 514 may determine the yield signed should be changed to a stop sign. If a threshold number of events occur in a turning lane when the traffic signal is changing, the example reaction processor 514 may determine a green turn arrow should be installed and/or the green turn arrow should be longer to fully empty the turn lane and avoid any last minute turning that may lead to events.

The example event processor 516 may aggregate the collected data, determine if the data is redundant, determine if the data is accurate, determine if additional data is needed, determine the extent of any damage to vehicles or infrastructure devices, determine repair or replacement costs, generate reports, generate insurance claims, process insurance claims, etc. The example event processor 516 may determine the amount of data that is collected, stored, processed, and/or transmitted based on the severity of the event and/or damage to the vehicles/infrastructure. For example, a minimum amount of information may be collected, stored, processed, and/or transmitted when a vehicle hits a pothole or is involved in a fender-bender. In contrast, when one or more vehicles or infrastructure devices are totaled, a maximum amount of data may be collected, stored, processed, and/or transmitted. Similarly, insurance claims may be classified, based on the severity of the event, as minor, major, total loss, or whatever classification is appropriate.

The example communication link device 518 may send and/or receive data from other responsive devices, which may form an ad-hoc network of responsive devices (e.g., connected vehicles, connected traffic signals, traffic cameras, automatic telling machine cameras, infrastructure devices, etc.) described herein. The example communication link device 518 may send and/or receive data to one or more personnel including emergency services (e.g., EMTs, fire department, hospital staff, etc.), authorities (e.g., police), repair services (e.g., vehicle repair shops, infrastructure repair contractors, etc.), rental vehicle services, towing services, entities related to drivers of one or more vehicles (e.g., family members associated with insurance plan), insurance providers, etc. In some examples, the communication link device 518 might not send data based on whether the event processor 516 determines the event is significant enough (e.g., above a damage, cost, or the like, threshold) to involve additional entities.

The example event database 524 may be a computer readable storage medium or memory that stores information associated with a plurality of previous events and/or event simulations. The event database 524 may include previous event reports detailing dates, times, speeds of vehicles involved in the event, vehicle identification numbers, license plate information, routes, locations of the events (e.g., latitude and longitude, address, street, intersection, etc.), sensor and imagery data, whether safety features were equipped/activated in a vehicle, NHTSA level of autonomy of the vehicle, whether the vehicle or driver was in control of the vehicle, communications from the vehicle to the driver, driving conditions, weather conditions, insurance coverage information, event reports, infrastructure devices data, insurance claim information (e.g., whether a claim was submitted, whether the claim was settled, the time taken to settle the claim, etc.), type of damage, severity of damage, parties informed (e.g., EMTs, insurance entities, infrastructure repair services, etc.), condition of the vehicle, insured/vehicle owners, number of passengers, whether seat belts were utilized, passenger weight, vehicle braking, estimate cost to replace/repair damage, etc. Such data may be used by the sub scription-based event and reward processing platform 502 and one or more machine learning algorithms for identification of new events, determining causes of the events, associated fault to entities involved in the event, determining reactionary measures, etc.

The subscription-based event and reward processing platform 502 may receive data from subscribers and may be accessible to subscribers. The subscriber may be a vehicle (such as vehicle 104, 106, 302, 304, 504, and/or 506), an individual associated with that vehicle, a telematics device installed in the vehicle, an entity (such as a ridesharing service, car-sharing service, car rental agency), or the like. Any of these entities may register as a subscriber with the subscription-based event and reward processing platform 502. The registration may include receiving identifying information (such as a name, contact information, VIN, device ID, or the like) for a subscriber and in turn, assigning the subscriber a subscription number or identification.

Once the subscriber is registered with the subscription-based event and reward processing platform 502, the subscriber may transmit data (such as data collected from one or more vehicle operation sensors from one or more vehicles before, during, and after an event) to the subscription-based event and reward processing platform 502 or to one or more cloud-based storage devices. In one instance, the transmission of this collected data may be initiated by the subscription-based event and reward processing platform 502 (for example, at predetermined time intervals, in response to identifying an event, etc.). In another instance, the transmission of this collected data may be initiated by a subscriber or a computing device associated with the subscriber. For example, if a subscriber is involved in an event or is operating a vehicle when an event occurs nearby, the subscriber may initiate upload of data collected by the vehicle.

The subscriber may also send one or more subscription preferences to the subscription-based event and reward processing platform 502. For example, a subscriber may prefer to be notified of any event that occurs within a predetermined radius or distance of the driver. In another example, the subscriber may prefer to be notified of only certain types of events (accidents, poor driving behavior, etc.).

Once the subscription-based event and reward processing platform 502 collects vehicle-related data from one or more subscribers, the subscription-based event and reward processing platform 502 may process the collected data to identify an event, such as event 306. Upon detection of an event, the subscription-based event and reward processing platform 502 may determine the faults/causes of that event. The subscription-based event and reward processing platform 502 may then generate one or more objects, such as rewards, for one or more subscribers, and transmit those one or more objects to computing devices associated with the one or more subscribers.

Once the subscription-based event and reward processing platform 502 has completed processing of the data (for example, to identify an event), the subscription-based event and reward processing platform 502 may retain the collected data or delete the data from its storage devices. For example, if processed data is determined to not contain any event-related data, the subscription-based event and reward processing platform 502 may delete the data to optimize its storage resources. In another example, if the processed data is determined to contain sensitive information (for example, audio from inside the vehicle), the subscription-based event and reward processing platform 502 may delete the data in order to protect the privacy of its subscribers.

The subscription-based event and reward processing platform 502 may use the processed data to identify events, transmit reactionary measures, and transmit objects (such as rewards) to its subscribers. In addition, the subscription-based event and reward processing platform 502 may use the processed data to develop training programs for drivers. For example, once the subscription-based event and reward processing platform 502 has identified an event within data collected from one or more vehicles, the subscription-based event and reward processing platform 502 may identify the factors that contributed to causing the event (speed, poor weather conditions, deterioration of the vehicle, poor braking, tailgating, careless driving, distracted driving, etc.).

The subscription-based event and reward processing platform 502 may the utilize all of its identified events and the factors surrounding those events to develop simulated driver training modules. Interactive simulations depicting various driving situations may be created and both new and experienced drivers may interact with these simulations to determine their reactions. Comparisons of how different drivers react to the same simulated situation may be used to determine baseline reactions, which in turn may be used to test the driving skills of drivers (who may or may not be subscribers to the subscription-based event and reward processing platform 502).

In another example, the subscription-based event and reward processing platform 502 may utilize the data collected from all of its subscribers to build a large-scale driving pattern of its subscribers. For example, the subscription-based event and reward processing platform 502 can track its subscribers' driving behaviors, such as speeding, acceleration, deceleration, tailgating, braking, drifting, and the like. Using this data, the subscription-based event and reward processing platform 502 may develop one or more models reflecting the large-scale driving patterns of driving behaviors. Once the large-scale driving patterns of the totality of the subscribers of the subscription-based event and reward processing platform 502 is generated, driving scores for individual drivers can be generated by comparing driving behaviors of the individual drivers to driving behaviors of the large-scale driving pattern. These driving scores can be used by the subscription-based event and reward processing platform 502 to determine which subscribers should be rewarded for good driving behaviors and which subscribers should be penalized for poor driving behaviors.

The example event detector 510, the example fault and causation identifier 512, the example reaction processor 514, the example event processor 516, the example communication link device 518, the example vehicle database 520, and/or more generally, the subscription-based event and reward processing platform 502, the example event database 524, and/or other computing devices described herein may each be implemented via a hardware platform such as, for example, the computing device 200 illustrated in FIG. 2.

Figure 6:
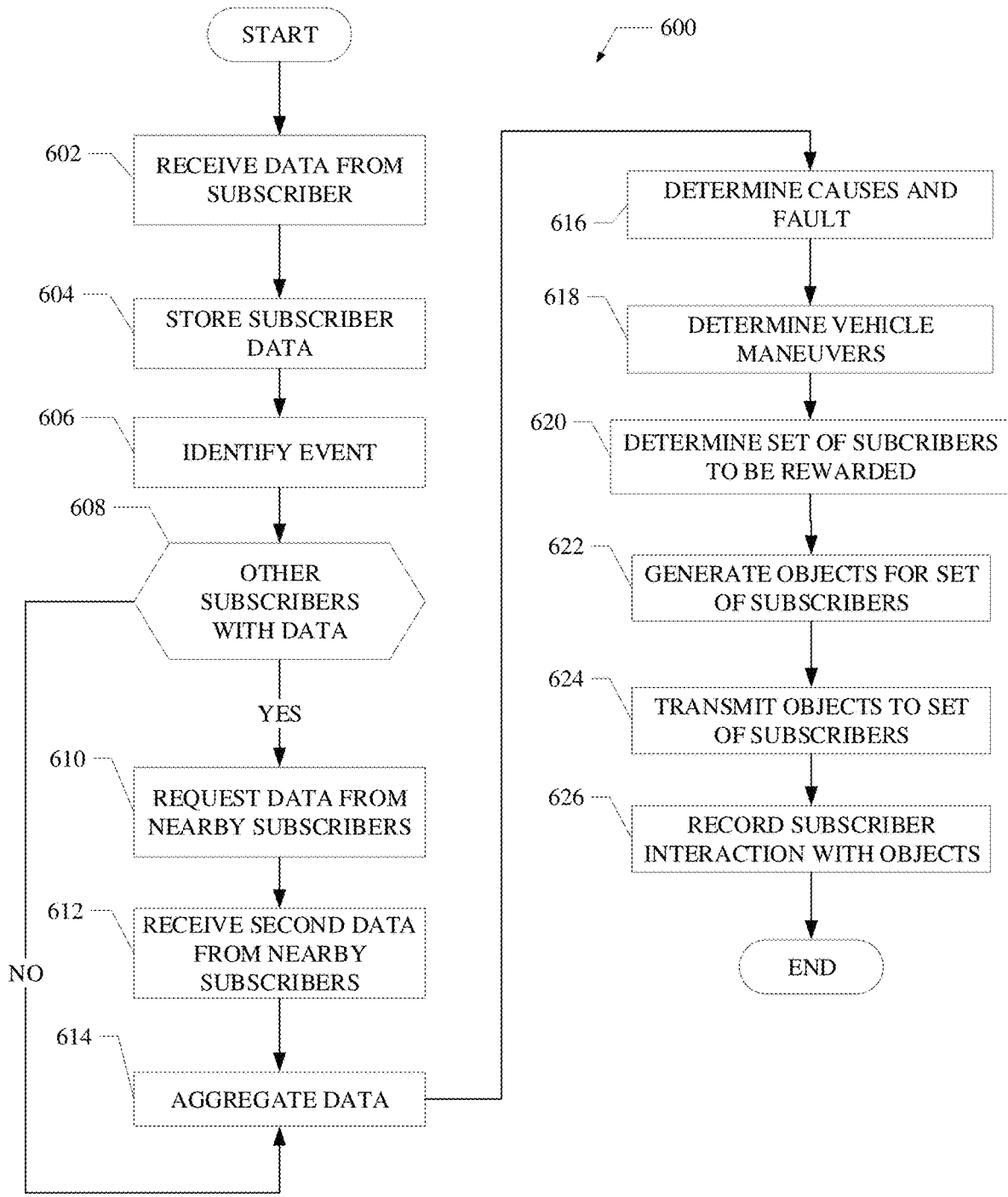
FIG. 6 is a flow chart illustrative of a process for implementing an example subscription-based event and reward processing platform in accordance with one or more aspects described herein.

FIG. 6 illustrates a flow chart illustrating a process for implementing an example subscription-based event and reward processing system in accordance with one or more aspects described herein. In some examples, the process may be executed via machine readable instructions that, when executed, may cause a subscription-based event and reward processing platform 502 to implement a process 600. The example process 600 begins at block 602, wherein the subscription-based event and reward processing platform 502 may receive data from a subscriber. The subscriber may be a vehicle (such as vehicle 302), an individual associated with that vehicle, a telematics device installed in the vehicle, or the like.

The data from the subscriber may include data from sensors in a vehicle, sensors outside a vehicle, audio data inside/outside a vehicle, video data inside/outside a vehicle, Lidar data, and Radar data, and the like. The sensor data may be data from any of the sensors discussed above in reference to FIGS. 1-5. As disclosed herein, the amount of data that is collected, stored, processed, and/or transmitted may be proportionate to the severity of the event. In some examples, the frequency of data collection may also vary. For example, sensor data may be collected periodically at predetermined intervals, continuously, may be monitored continuously and only collected (i.e., recorded) upon the occurrence of an event, etc. In some examples, all sensor data may be continuously collected, but only sensor data corresponding to event detection may be continuously analyzed until an event occurs. Thereafter, all data may be analyzed (e.g., serially, in parallel, on-demand, etc.) in order to conserve on-vehicle or on-infrastructure device computing resources.

At block 604, the subscription-based event and reward processing platform 502 may store the data received from the subscriber along with subscriber-related data. The subscription-based event and reward processing platform 502 may store one or more of the data received from the subscriber and the subscriber-related data in database 520 and/or one or more external databases (not shown in FIG. 6).

The subscription-based event and reward processing platform 502 may tag the data with the subscriber-related data before or after storage. For example, if the subscriber is an individual, the subscription-based event and reward processing platform 502 may tag the data with the individual's personal information (name, address, contact information, and the like). If the subscriber is a device (for example, a cellular device, a telematics device, a vehicle, or the like), the subscription-based event and reward processing platform 502 may tag the data with the information identifying the device (for example, a device ID, a device registration number for the subscription service, a VIN, identification of an entity that registered the device with the subscription service, or the like). Tagging the data may include linking the data received from the subscriber with the subscriber-related data.

At block 606, the example event detector 510 may identify an event from the data received from the subscriber. In one example, the event may include one or more vehicles, such as event 306. However, the detected events are not limited to vehicle-related events. The event may be one that takes place within a particular proximity to the vehicle (wherein that proximity may be determined based on the recording devices located internal to and external to the vehicle). For example, vehicle 302 may record a shooting or assault that occurs within a particular proximity to the vehicle 302 using a video recording device located in the vehicle 302 (for example, a video recorder of a cellular device). Identifying the event from the data received from the subscriber may be performed via various image and/or video processing algorithms as discussed above in reference to FIGS. 1 and 5.

At block 608, the subscription-based event and reward processing platform 502 may determine if there are other subscribers from which data should be collected. For example, the subscription-based event and reward processing platform 502 may have detected event 306 based on subscriber data uploaded from a first computing device associated with vehicle 302. Responsive to detecting event 306, the subscription-based event and reward processing platform 502 may query the database 520 for driver and insurance provider information associated with the first vehicle 302. Additionally, the example event detector 510 may collect the sensor data for the first vehicle 302 surrounding the event 306. Additionally, the subscription-based event and reward processing platform 502 may query database 520 to determine if any subscribers are located within a particular distance from the location of the event 306. In this example, the subscription-based event and reward processing platform 502 may determine that vehicle 304 was involved in the identified event, and that one or more of vehicles 312, 316, 320, and/or 324 was within a predetermined distance of the event 304 during the event, at a predetermined time window prior to the event, or at a predetermined time window after the event. Thus, the subscription-based event and reward processing platform 502 may determine that subscriber data is required from vehicles 304, 316, 320, and/or 324 (for example, sensor data from the vehicles, video data from computing devices associated with the vehicles, etc.).

At block 610, the subscription-based event and reward processing platform 502 may request data from other subscribers. For example, the subscription-based event and reward processing platform 502 may send messages to each subscriber that was determined to be within the particular distance from the location of the event 306 when the event occurred (for example, vehicles 316, 320, and/or 324 or subscribers associated with vehicles 316, 320, and/or 324) and each subscriber that was determined to be involved in the event 306 (for example, vehicle 304 the subscriber associated with vehicle 304). The message may include timestamp information for the identified event so that the receiving subscriber can upload the appropriate data. The subscription-based event and reward processing platform 502 may request that the receiving subscriber upload any data (i.e., audio data, image data, and/or video data) corresponding to the timestamp of the identified event and/or during a predetermined window of time prior to the timestamp and/or after the timestamp. The subscription-based event and reward processing platform 502 may additionally or alternatively retrieve the requested data from database 520. For example, the subscription-based event and reward processing platform 502 may analyze a timestamp of the event. If the event occurred outside a predetermined time window (for example, more than a couple of minutes prior to the event identification), the subscription-based event and reward processing platform 502 may determine if the requested data has already been uploaded by subscribers (without prompt) to database 520 (or one or more external databases). If so, the subscription-based event and reward processing platform 502 may not message subscribers from which the desired data was previously uploaded.

If the subscription-based event and reward processing platform 502 determines that certain subscribers do not currently have the ability to upload data directly to the subscription-based event and reward processing platform 502, this request may be made indirectly. For example, the subscription-based event and reward processing platform 502 may determine that though vehicle 310 was within a predetermined distance of the event 306 when it occurred, vehicle 310 is not able to currently upload data to the subscription-based event and reward processing platform 502. Thus, the subscription-based event and reward processing platform 502 may request a subscriber or a vehicle associated with a subscriber (for example, vehicle 302) to send the request for data to vehicle 310 via one or more V2V communications. Vehicle 310 may then send the requested data to vehicle 302 via additional V2V communications, and vehicle 302 may then upload the data from vehicle 310 to the subscription-based event and reward processing platform 502.

At block 612, the subscription-based event and reward processing platform 502 may receive data from the subscribers from which the data was requested at block 610. The data received from the subscribers may include audio data, image data, Lidar data, Radar data, and/or video data. The received data may have been recorded at the time the identified event occurred, during a predetermined time window prior to the occurrence of the identified event, and/or during a predetermined time window subsequent to the occurrence of the event. All of the data received from the various subscribers identified in block 610 may be stored in database 520 and/or one or more external databases as described above in reference to block 604.

In certain instances, data from the subscribers may be received directly via the subscribers (for example, data from a first individual subscriber may be received via the first individual's cell phone, data from a first vehicular subscriber may be received via a telematics device installed within a first vehicle, and the like). In other instances (for example, when a subscriber does not have access to the subscription-based event and reward processing platform 502 or a cloud based storage device associated with the subscription service), the data from a subscriber may be received via V2V and/or V2I communications. For example, the subscription-based event and reward processing platform 502 may receive the data for vehicle 304 directly from vehicle 304, or from a mobile device associated with vehicle 304. Vehicle 310 may not have access to the subscription-based event and reward processing platform 502 so the subscription-based event and reward processing platform 502 may receive the recorded data of vehicle 310 via vehicle 302.

Once data from the other subscribers has been received, or if at block 608, the subscription-based event and reward processing platform 502 determines that there are no other subscribers from which data is to be requested (block 608: NO), control proceeds to block 614. At block 614, the subscription-based event and reward processing platform 502 aggregates the collected data. In some examples, the subscription-based event and reward processing platform 502 eliminates redundant information. In some examples, redundant information may be used to verify accuracy of the collected data.

At block 616, the example fault and causation identifier 512 analyzes the aggregated data to determine causes of the event 306 and/or determine fault. As disclosed herein, causation may be assigned to a single cause or may be associated with numerous causes. In some examples, the example fault and causation identifier may query database 520 for historical event and fault data, and use machine learning algorithms to determine the causes of the event 306 and/or determine fault. As disclosed herein, fault may be assigned to a single party (e.g., 100% at fault) or may be distributed amongst the parties involved in the event 306 (e.g., first vehicle 302 is 20% at fault, second vehicle 304 is 70% at fault, another vehicle is 10% at fault, etc.).

At block 618, the example reaction processor 514 may determine, based on the aggregated data, one or more vehicle maneuvers to avoid and/or reduce the severity of the event 306. In some examples, the reaction processor 514 may determine, based on the aggregate data, reactionary measures to prevent events before they occur (e.g., fix a pothole, add a traffic signal, etc.). If the processing as described in blocks 602-618 is performed in near real-time, the vehicle maneuvers may include automatic braking for vehicles nearby the identified event, audio/video warnings for drivers located in vehicles nearby the identified event, automatic tightening of seatbelts, and/or the like. As disclosed herein, the subscription-based event and reward processing platform 502 may transmit may transmit such vehicle maneuvers to one or more vehicles within the vehicle and/or infrastructure device ad-hoc network to inform other vehicles of the event. In one example, the vehicle maneuvers may be transmitted via a communication link device such as communication link device 518. Autonomous vehicles may receive the one or more vehicle maneuvers and implement them accordingly (e.g., via a vehicle control computing device controlling operation of the autonomous vehicle). Non-autonomous or semi-autonomous vehicles may present the one or more vehicle maneuvers to drivers of the non-autonomous or semi-autonomous vehicles. Accordingly, other vehicles not involved in the event may be instructed to avoid the event and/or similar events based on the data collected by the vehicles involved in the event. Such instructions may include alternative routes that may be utilized to avoid the identified event.

At block 620, the subscription-based event and reward processing platform 502 may determine a set of subscribers to be rewarded. The set of subscribers may be those subscribers that uploaded data that was used in block 616 to determine cause/fault of the identified event, the subscriber that uploaded data in block 604, and/or the subscribers that uploaded data in block 612.

At block 622, the subscription-based event and reward processing platform 502 may generate one or more objects for each subscriber in the set of subscribers. For example, the subscription-based event and reward processing platform 502 may generate one or more rewards for each subscriber in the set of subscribers. The rewards may be used as credit at various online or brick-and-mortar establishments, may be in the form of cryptocurrency, or the like. The value of the reward may be based on the extent to which the subscriber's collected data was used by the subscription-based event and reward processing platform 502. If the identified event is a bad driving behavior for a subscriber, the one or more objects may be a deduction in rewards credit for the subscriber. The amount of the deduction may be determined based on the severity of the bad driving behavior, the number of subscribers that uploaded data including the bad driving behavior, or the like.

The rewards for each subscriber may be different (for example, customized for that particular subscriber) or the same. To generate customized rewards for a subscriber, the subscription-based event and reward processing platform 502 may query database 520 to determine historical reward data for the subscriber and/or reward preference data for the subscriber. Historical reward data for the subscriber may include a listing of rewards that have been sent to the subscriber in the past and subsequent interactions by the subscriber with the rewards. For example, if the subscriber has been given rewards to five different establishments in the past and repeatedly used the rewards for only a couple of those establishments, the subscription-based event and reward processing platform 502 may determine that the subscriber is more likely to utilize rewards for those couple of establishments. Reward preference data for the subscriber may be reward preferences explicitly provided by the user when registering for the subscription service (or subsequent to registering for the subscription service). The preference data may include particular types of rewards that the subscriber prefers to receive.

Based on the historical rewards data and/or the rewards preference data queried for each subscriber in the set of subscribers, the subscription-based event and reward processing platform 502 may generate customized one or more objects for each subscriber. In addition, the subscription-based event and reward processing platform 502 may utilize additional data to generate the one or more objects. For example, if the subscriber is within a predetermined location at which a first object may be redeemed, the subscription-based event and reward processing platform 502 may include the first object in the one or more objects generated for that user. In another example, the subscription-based event and reward processing platform 502 may analyze a subscriber's travel route to determine other objects that may be of interest to the subscriber.

At block 624, the subscription-based event and reward processing platform 502 may transmit the one or more objects to the subscribers in the set of subscribers. If a first subscriber is an individual, the one or more objects for the first subscriber may be transmitted to a computing device associated with the first subscriber. For example, the one or more objects may be transmitted to a cellular device associated with the first subscriber.

The subscription-based event and reward processing platform 502 may upload the one or more objects to an Internet website and transmit a hyperlink to the mobile device. Once the hyperlink is selected, the cellular device may be configured to automatically launch a first mobile application that may be configured to display the one or more objects. For example, the first mobile application may be a web browser that outputs a web page displaying the one or more objects. The one or more objects may be linked to additional mobile applications installed on the cellular device, such that selection of a first object of the one or more objects may automatically launch a second mobile application associated with an establishment. The subscriber may then proceed to redeem a reward through the second mobile application.

Alternatively, the subscription-based event and reward processing platform 502 may transmit the one or more objects to various mobile applications installed on the subscriber's cellular device. For example, a first object may be associated with a first mobile application installed on the subscriber's cellular device. Thus, the subscription-based event and reward processing platform 502 may transmit data associated with the first object to the first mobile application, along with a notification to be displayed on the subscriber's cellular device. When the subscriber selects the notification, the cellular device may automatically launch the first mobile application, and the subscriber may subsequently redeem the reward via the first mobile application.

Redemption of the rewards via the one or more objects is not limited to the mobile applications. For example, the rewards may be redeemed at brick-and-mortar establishments indicated by the one or more objects.

At block 626, the subscription-based event and reward processing platform 502 may monitor and record interactions between the one or more objects transmitted at block 624 and the subscribers. For example, the subscription-based event and reward processing platform 502 may track which particular objects each subscriber interacts with (for example, via mobile applications) and which ones the subscriber does not interact with. This may in turn be stored in database 520 as historical rewards data to be subsequently used when generating one or more objects for the subscribers.

While process 600 is described referencing subscription-based event and reward processing platform 502 located remotely from the vehicle, an instance of a subscription-based event and reward processing platform 502 installed in a vehicle may similarly perform such operations.

Figure 7:
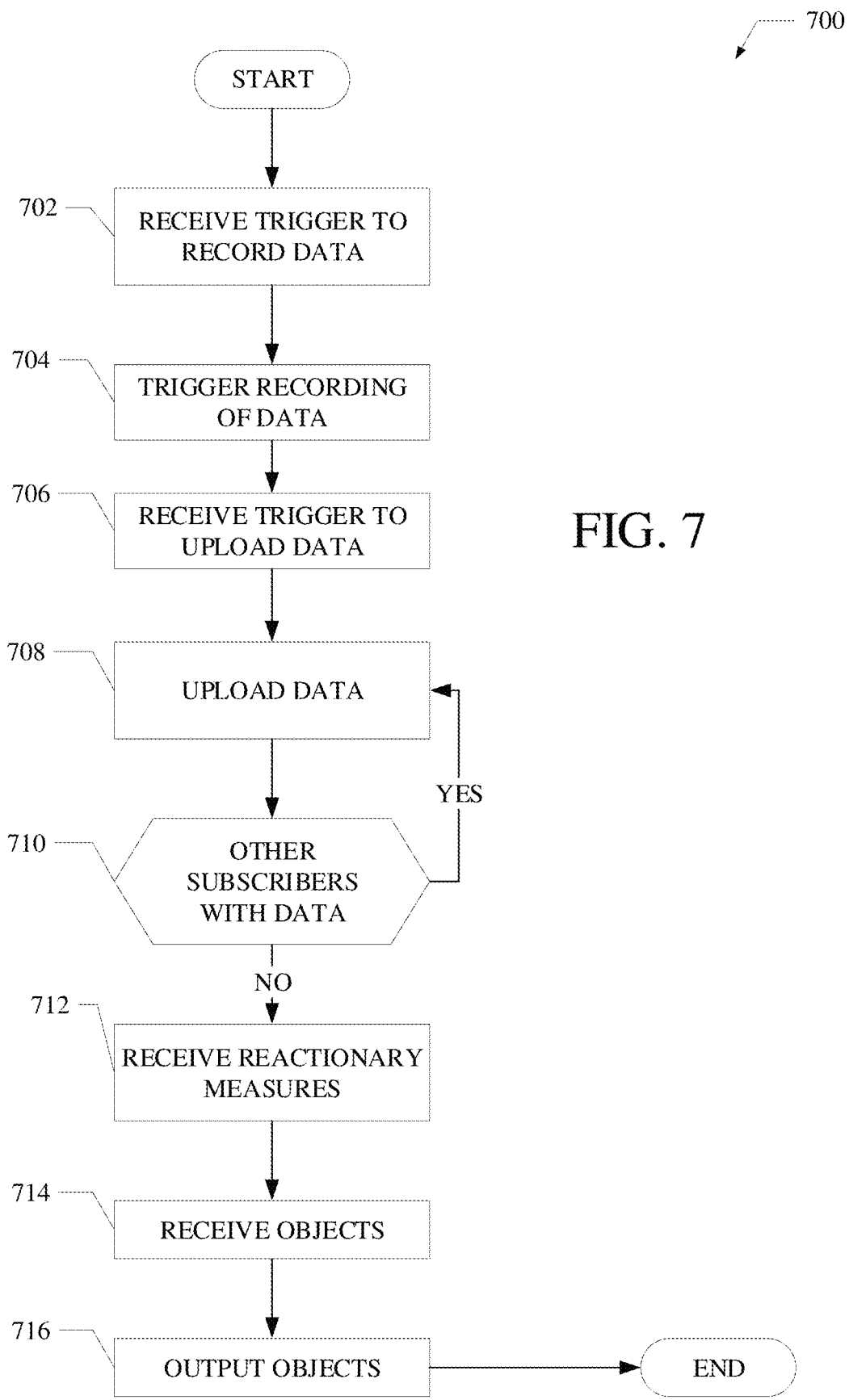
FIG. 7 is a flow chart illustrative of a process for implementing an example subscription-based event and reward processing platform in accordance with one or more aspects described herein.

FIG. 7 illustrates a flow chart illustrating a process for implementing an example subscriber-based event and reward processing system in accordance with one or more aspects described herein. In some examples, the process may be executed via machine readable instructions that, when executed, may cause one or more computing devices to implement a process 700. The one or more computing devices may be related to a subscriber (for example, a mobile device, a control system of a vehicle, a telematics device, or the like).

The example process 700 begins at block 702, wherein the computing device receives a trigger to record data. In one instance, the trigger to record data may be generated and received internally at the computing device. For example, the computing device may be programmed to trigger the recording of data at particular times or particular time intervals. In another example, the computing device may be programmed to trigger the recording of data each time a designated vehicle is operated (that is, sensor data, audio data, video data, Lidar data, Radar data, and the like may be continuously collected by the vehicle whenever it is in operation). In another instance, the request to trigger data may be received via a display of the computing device. For example, a user may input the trigger via a user interface output to the display of the computing device. In yet another instance, the trigger may be received by the computing device from the subscription-based event and reward processing platform 502.

At block 704, the computing device may trigger recording of data. The computing device may send recording control signals to one or more devices. For example, the computing device may send recording signals to a plurality of devices that are located inside and/or outside a vehicle, such as sensors, audiovisual recording devices, Lidar recording devices, Radar recording devices, cellular devices, and the like. As a result, the recording devices may record data from both inside a vehicle and outside a vehicle. Regarding the latter, in some instances, the video recording devices may include multiple wide-angle lenses, such that all 360 degrees surrounding the vehicle may be recorded.

At block 706, the computing device may receive a trigger to upload data. In one instance, the trigger may be internally generated. For example, the trigger may be internally generated upon a predetermined amount of time passing subsequent to the triggering of the recordings in block 704, or at regular time intervals (for example, hourly, daily, weekly, etc.). In another instance, the trigger may be received via a display of the computing device. For example, a user may input the trigger via a user interface output to the display of the computing device. In yet another instance, the trigger may be received by the computing device from the subscription-based event and reward processing platform 502, or from a different vehicle (i.e., via V2V communications). In each of these instances, receiving the trigger at long time intervals (for example, daily, weekly, monthly) may result in a batch-uploading of the recorded data. In another example, the computing device may receive the data collected by the sensors and process the data internally. The computing device may be configured to analyze the data using one or more models to detect one or more events, such as poor driving behavior, or event 306. These one or more models may be generated at the subscription-based event and reward processing platform 502 and may be improved over time using various model-training techniques. If the computing device detects an event via its own internal processing of the data collected by vehicle sensors and/or the computing device itself, the computing device may internally generate a trigger to upload the collected data (and event data) to the subscription-based event and reward processing platform 502.

At block 708, the computing device may initiate the uploading of recorded data to the subscription-based event and reward processing platform 502 (or to one or more external databases of the subscription-based event and reward processing platform 502, such as a cloud database or cloud server). If data from multiple recording devices is to be uploaded, the computing device may aggregate the data prior to the uploading. Alternatively, the computing device may upload the data from each recording device separately. In addition to uploading recorded data from other devices, computing device may upload data that was recorded by the computing device. For example, if the computing device is a mobile cellular device, its sensors and cameras may record data when the computing device is in the vehicle.

Prior to uploading the recorded data, the computing device may tag the data with subscriber-related information. For example, if the subscriber is an individual, the computing device may tag the recorded data with information identifying the individual (name, contact information, subscription-service related identification number, or the like). If the subscriber is a vehicle, the computing device may tag the recorded data with information identifying the vehicle (VIN, identification of an entity that registered the vehicle with the subscription service, subscription-service related identification number, or the like).

At block 710, the computing device may determine if there are other subscribers for which the computing device is to upload data. In one instance, this may require that the computing device ping nearby subscribers to determine if any of those subscribers have recorded data to be uploaded by the computing device. If so, the computing device may receive the data to be uploaded from another subscriber (for example, via V2V communication, V2I communication, or communication via one or more networks) and then processing may return to block 708. In another instance, the computing device may request and receive this information from the subscription-based event and reward processing platform 502, and then request the data to be uploaded from the appropriate subscriber.

At block 712, the computing device may receive reactionary measures from the subscription-based event and reward processing platform 502. In one instance, the reactionary measures may be directed to steps to be performed by control systems of a vehicle, such as automatic braking, automatic tightening of seat belts, outputting of audio/video warnings, repositioning the steering wheel to minimize damage to the driver in case of collision, activating lights inside/outside the vehicle, or the like. In this instance, the computing device may parse the reactionary measures and send each reactionary measure to its corresponding control system.

Figure 8A:
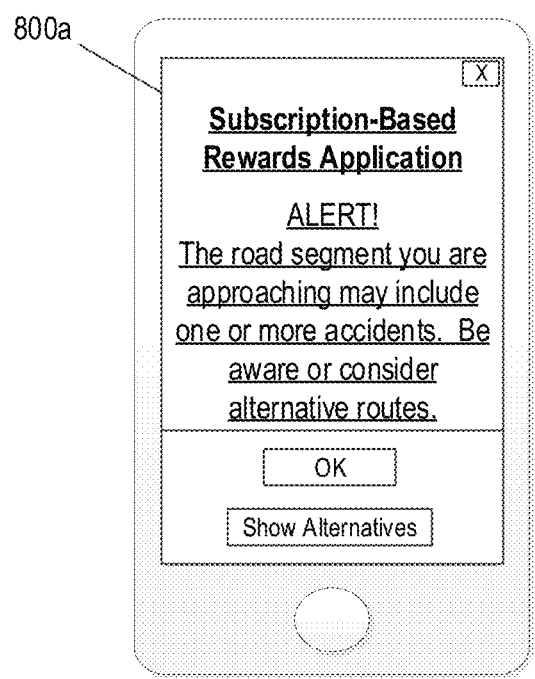
FIGS. 8a and 8b are user interface screens that may be implemented within an example subscription-based event and reward processing platform in accordance with one or more aspects described herein.
Figure 8B:
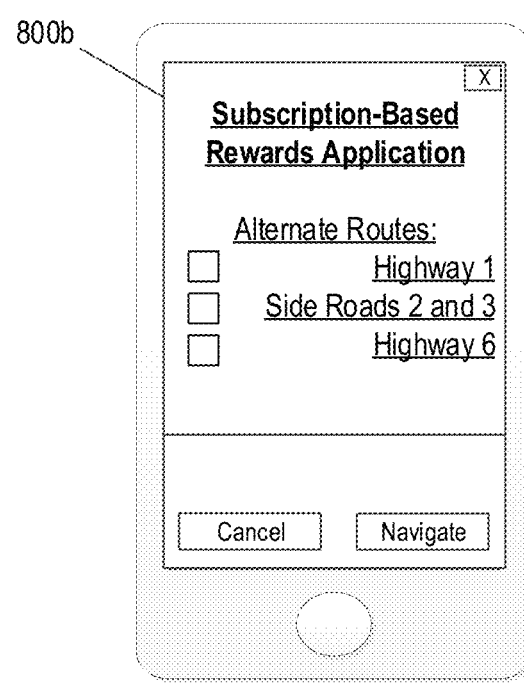

In another instance, a reactionary measure may be a notification for the driver (for example, a warning that there is an accident ahead) or an alternate route for the driver (for example, to avoid a nearby accident). In this instance, the reactionary measure may be output to a display device of the computing device (or another computing device) so that it may be viewed by a subscriber. For example, the computing device may generate a first user interface 800a and output it to a display screen of the computing device, as shown in FIG. 8A. The first user interface may include the notification received from the subscription-based event and reward processing platform 502 and may provide one or more user-selectable buttons associated with acknowledging the notification or a request for alternative routes. If the latter is selected, the computing device may generate a second user interface 800b and output it to the display screen of the computing device, as shown in FIG. 8B. The second user interface may include multiple selectable links, each associated with an alternative route received from the subscription-based event and reward processing platform 502 (or generated at the computing device responsive to a notification from the subscription-based event and reward processing platform 502 that a vehicle is approaching an identified event). The second user interface 800b may also include multiple user-selectable options (shown as "Cancel" and "Navigate"). The latter, when selected by the user, may launch a mobile navigation application with an interactive map displaying the selected alternate route.

At block 714, the computing device may receive one or more objects from the subscription-based event and reward processing platform 502. For example, the computing device may receive one or more rewards that may be redeemed by a subscriber associated with the computing device.

Figure 9:
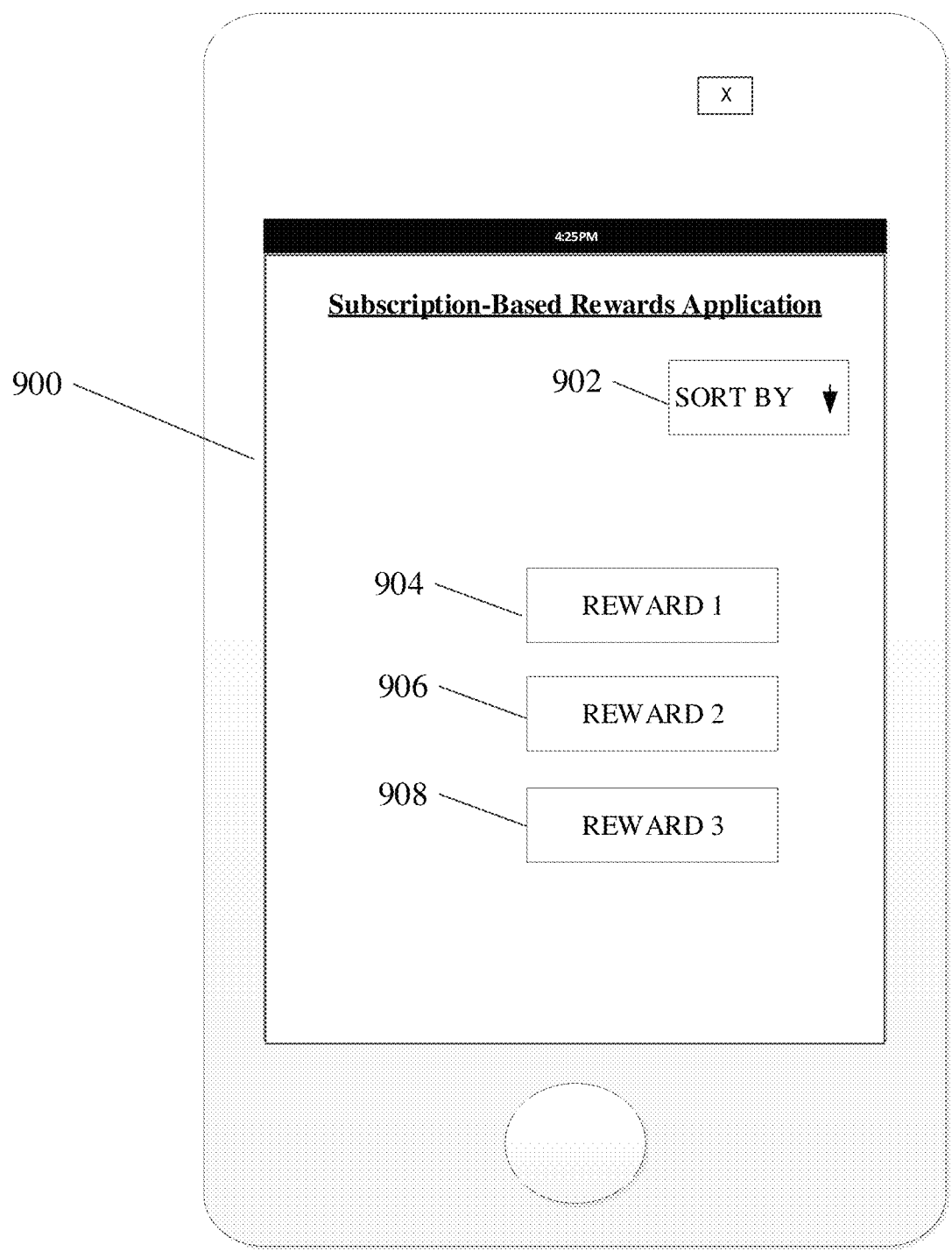
FIG. 9 is a user interface screen that may be implemented within an example subscription-based event and reward processing platform in accordance with one or more aspects described herein.

At block 716, the computing device may output the one or more objects for display. For example, the computing device may generate a user interface 900 and output the user interface 900 to a display screen of the computing device, as shown in FIG. 9. The user interface 900 may be associated with a mobile application for the rewards subscription service and may include multiple-user selectable icons. For example, user-selection of icon 902 may result in a display of a drop-down menu that allows the user to sort each of the rewards. The rewards may be sorted by date (such as newest, oldest, etc.), distance (such as a distance between the subscriber's current location and the different establishments associated with the different rewards), favorites (such as ranking higher any rewards associated with an establishment that was previously identified as a favorite of the user), etc. Each of the selectable icons 904, 906, and 908 may be associated with a different reward.

Upon selection of a reward (via selection of one of the selectable icons 904, 906, 908), the user interface 900 may be updated based on the selected reward. The contents of the updated user interface 900 may depend on the particular reward selected.

For example, if the user selects selectable icon 904, the computing device may launch a web browser that displays additional data related to the reward (for example, instructions for redeeming the reward) and/or additional data related to the establishment associated with the reward (for example, the closest location(s) of the establishment). If the user selects selectable icon 906, the computing device may launch a second mobile application. The second mobile application may be associated with the establishment associated with the second reward. The second mobile application may output a user interface with additional data related to the reward (for example, instructions for redeeming the reward) and/or with additional data related the establishment associated with the reward (for example, the closest location(s) of the establishment). Additionally, the subscriber may redeem the reward directly through the second mobile application.

The computing device may track the subscriber's interactions with the rewards and transmit the recorded interactions to the subscription-based event and reward processing platform 502. For example, if the subscriber selects selectable icon 904, the computing device may record that the first reward was selected by the subscriber and transmit this recorded data to the subscription-based event and reward processing platform 502. In another example, if the subscriber redeems the second reward via the second mobile application, the computing device may record this redemption and transmit the recorded data to the subscription-based event and reward processing platform 502.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:

1. A system comprising:
 a first vehicle associated with a first subscriber and comprising a first plurality of vehicle operation sensors to detect vehicle and environment parameters;
 a second vehicle associated with a second subscriber and comprising a second plurality of vehicle operation sensors;
 a first computing device associated with the first subscriber;
 a second computing device associated with the second subscriber; and
 a server comprising:
  at least one processor; and
  memory comprising instructions that, when executed by the at least one processor, cause the server to:
   receive first data acquired by the first plurality of vehicle operation sensors from the first computing device;
   identify an occurrence of an event involving the first vehicle and the second vehicle;
   request, from the second computing device, data acquired by the second plurality of vehicle operation sensors;
   receive, from the first vehicle, second data acquired by the second plurality of vehicle operation sensors of the second vehicle;
   identify, based on the first data and the second data, which vehicle of the first vehicle or the second vehicle is at-fault;
   determine, for a first subscriber associated with the first computing device and responsive to determining that the first data was used in determining which of the first vehicle or the second vehicle is at-fault, one or more objects;
   transmit, to the first computing device, the one or more objects,
   generate, based on the event, an event avoidance maneuver; and
   transmit, to a second subscriber and responsive to determining that the second subscriber is within a predetermined distance of the event, the event avoidance maneuver.

2. The system of claim 1, wherein the first vehicle is an autonomous vehicle.

3. The system of claim 1, wherein the instructions, when executed by the at least one processor, cause the server to:
 request, via the first computing device, recorded data associated with the second subscriber.

4. The system of claim 3, wherein the instructions, when executed by the at least one processor, cause the server to:
 receive, via the first computing device, the recorded data associated with the second subscriber.

5. The system of claim 1, wherein the one or more objects are determined based on historical data associated with the first subscriber.

6. The system of claim 1, wherein the instructions, when executed by the at least one processor, cause the server to:
 receive, from the first computing device, data associated with an interaction between the first subscriber and the one or more objects; and
 store the data.

7. An apparatus comprising:
one or more processors; and
memory storing instructions that, when executed by the one or more processors, cause the apparatus to at least:
  receive, from a first computing device associated with a first subscriber, first data acquired by a first plurality of vehicle operation sensors of a first vehicle;
  identify, based on the first data, an occurrence of an event involving a second vehicle and a third vehicle;
  receive, from the first computing device associate with the first subscriber, second data acquired by a second plurality of vehicle operation sensors of the second vehicle;
  identify, based on the first data and the second data, which vehicle of the second vehicle or the third vehicle is at-fault;
  determine, for the first subscriber and responsive to determining that the first data was used in determining which of the first vehicle or the second vehicle is at-fault, one or more objects;
  transmit, to the first computing device, the one or more objects;
  generate, based on the event, an event avoidance maneuver; and
  transmit, to a second subscriber and responsive to determining that the second subscriber is within a predetermined distance of the event, the event avoidance maneuver.

8. The apparatus of claim 7, wherein the first vehicle is an autonomous vehicle.

9. The apparatus of claim 7, wherein the instructions, when executed by the one or more processors, cause the apparatus to:
  request, via the first computing device, recorded data associated with the second subscriber; and
  receive, via the first computing device, the recorded data associated with the second subscriber.

10. The apparatus of claim 7, wherein the one or more objects are determined based on historical data associated with the first subscriber.

11. The apparatus of claim 7, wherein the instructions, when executed by the one or more processors, cause the apparatus to:
  receive, from the first computing device, data associated with an interaction between the first subscriber and the one or more objects; and
  store the data.

12. A method comprising:
  receiving, from a first computing device associated with a first subscriber, first data acquired by a first plurality of vehicle operation sensors of a first vehicle;
  identifying, based on the first data, an occurrence of an event involving a second vehicle and a third vehicle;
  receiving, from the first computing device associated with the first subscriber, second data acquired by a second plurality of vehicle operation sensors of the second vehicle;
  identifying, based on the first data and the second data, which vehicle of the first vehicle or the second vehicle is at-fault;
  determining, for the first subscriber and responsive to determining that the first data was used in determining which of the first vehicle or the second vehicle is at-fault, one or more objects;
  transmitting, to the first computing device, the one or more objects,
  generating, based on the event, an event avoidance maneuver; and
  transmitting, to a second subscriber and responsive to determining that the second subscriber is within a predetermined distance of the event, the event avoidance maneuver.

13. The method of claim 12, further comprising:
  requesting, via the first computing device, recorded data associated with the second subscriber.

14. The method of claim 13, further comprising:
  receiving, via the first computing device, the recorded data associated with the second subscriber.

15. The method of claim 12, wherein the one or more objects are determined based on historical data associated with the first subscriber.

16. The method of claim 12, wherein the first vehicle is an autonomous vehicle.

17. The method of claim 12, further comprising:
  receiving, from the first computing device, data associated with an interaction between the first subscriber and the one or more objects; and
  storing the data.

* * * * *